(12) United States Patent
Le Carluer et al.

(10) Patent No.: US 12,112,429 B2
(45) Date of Patent: Oct. 8, 2024

(54) SYSTEM AND METHOD FOR PROVIDING PERSONALIZED TRANSACTIONS BASED ON 3D REPRESENTATIONS OF USER PHYSICAL CHARACTERISTICS

(71) Applicant: APPLICATIONS MOBILES OVERVIEW INC., Montreal (CA)

(72) Inventors: Lionel Le Carluer, Montreal (CA); Bryan Martin, Montreal (CA); Azadeh Farhadmonfared, Montreal (CA); Laurent Juppe, Montreal (CA); Sherif Esmat Omar Abuelwafa, Montreal (CA); Danae Blondel, Montreal (CA)

(73) Assignee: APPLICATIONS MOBILES OVERVIEW INC., Montreal (CA)

( * ) Notice: Subject to any disclaimer, the term of this patent is extended or adjusted under 35 U.S.C. 154(b) by 0 days.

(21) Appl. No.: 18/197,838

(22) Filed: May 16, 2023

(65) Prior Publication Data

US 2023/0368463 A1 Nov. 16, 2023

Related U.S. Application Data

(63) Continuation of application No. 17/974,163, filed on Oct. 26, 2022, now Pat. No. 11,694,395, which is a
(Continued)

(51) Int. Cl.
*G06T 17/00* (2006.01)
*G06Q 30/0601* (2023.01)
(Continued)

(52) U.S. Cl.
CPC ........ *G06T 17/00* (2013.01); *G06Q 30/0621* (2013.01); *G06Q 30/0641* (2013.01);
(Continued)

(58) Field of Classification Search
None
See application file for complete search history.

(56) References Cited

U.S. PATENT DOCUMENTS

| | | | |
|---|---|---|---|
| 5,960,411 A | 9/1999 | Hartman et al. | |
| 9,235,928 B2 | 1/2016 | Medioni et al. | |

(Continued)

FOREIGN PATENT DOCUMENTS

| | | |
|---|---|---|
| CA | 3072117 C | 5/2022 |
| EP | 3234925 A1 | 10/2017 |

(Continued)

OTHER PUBLICATIONS

International Search Report and Written Opinion with regard to the counterpart International Patent Application No. PCT/IB2022/054766 mailed Aug. 29, 2022.

*Primary Examiner* — Robert J Craddock
(74) *Attorney, Agent, or Firm* — BCF LLP

(57) ABSTRACT

The disclosed systems, components, methods, and processing steps are directed to determining user-item fit characteristics of an item for a user body part by accessing a three-dimensional (3D) reconstructed model of the user body part, accessing information about one or more 3D reference models of the item, the information for each 3D reference model including respective dimensional measurement, spatial, and geometrical attributes, performing a 3D matching process based on the 3D reconstructed model and the accessed information of the one or more 3D reference models to determine a best-fitting 3D reference model from the one or more 3D reference models, integrating the best-fitting 3D reference model with the 3D reconstructed model to provide a 3D best fit representation and displaying the 3D best fit representation along with visual indications of user-item fit characteristics.

20 Claims, 18 Drawing Sheets

Related U.S. Application Data continuation of application No. PCT/IB2022/054766, filed on May 20, 2022.

(60) Provisional application No. 63/192,863, filed on May 25, 2021.

(51) Int. Cl.
  *G06T 15/20* (2011.01)
  *G06T 19/00* (2011.01)
  *G06T 19/20* (2011.01)

(52) U.S. Cl.
  CPC .......... *G06T 15/205* (2013.01); *G06T 19/006* (2013.01); *G06T 19/20* (2013.01); *G06T 2215/16* (2013.01); *G06T 2219/2004* (2013.01); *G06T 2219/2021* (2013.01)

(56) References Cited

U.S. PATENT DOCUMENTS

| | | | |
|---|---|---|---|
| 9,878,209 B2 | 1/2018 | Nandimandalam et al. |
| 10,776,469 B2 | 9/2020 | Venkatesan et al. |
| 11,321,768 B2 | 5/2022 | Beauchamp |
| 11,341,182 B2 | 5/2022 | Ikonomov |
| 2010/0111370 A1 | 5/2010 | Black et al. |
| 2015/0154691 A1 | 6/2015 | Curry et al. |
| 2016/0180433 A1 | 6/2016 | Adeyoola et al. |
| 2016/0310064 A1 | 10/2016 | Cheng |
| 2017/0352091 A1 | 12/2017 | Chen et al. |
| 2021/0158017 A1 | 5/2021 | Blondel et al. |
| 2022/0180551 A1 | 6/2022 | Lui et al. |
| 2022/0188897 A1 | 6/2022 | Szeli et al. |
| 2022/0220663 A1 | 7/2022 | Schultz et al. |
| 2022/0222741 A1 | 7/2022 | Beauchamp |
| 2022/0253923 A1 | 8/2022 | Donnelly |
| 2022/0261066 A1 | 8/2022 | Dryer et al. |
| 2022/0262065 A1 | 8/2022 | Godbole |
| 2022/0270338 A1 | 8/2022 | Adams |
| 2022/0309567 A1* | 9/2022 | Han ........................ G06T 19/20 |

FOREIGN PATENT DOCUMENTS

| | | |
|---|---|---|
| EP | 3286675 A1 | 2/2018 |
| EP | 4016434 A1 | 6/2022 |
| EP | 4023155 A1 | 7/2022 |
| EP | 3877822 A4 | 8/2022 |
| WO | 2020093090 A1 | 5/2020 |
| WO | 2020240497 A1 | 12/2020 |
| WO | 2022169398 A1 | 8/2022 |

* cited by examiner

SYSTEM AND METHOD FOR PROVIDING PERSONALIZED TRANSACTIONS BASED ON 3D REPRESENTATIONS OF USER PHYSICAL CHARACTERISTICS

CROSS-REFERENCE TO RELATED APPLICATIONS

The present application is a continuation of U.S. patent application Ser. No. 17/974,163, filed on Oct. 26, 2022, which is a continuation of International Patent Application No. PCT/IB2022/054766, filed on May 20, 2022, which claims priority to U.S. Provisional Patent Application No. 63/192,863, filed on May 25, 2021, the entirety of each of which is incorporated herein by reference.

FIELD OF INVENTION

The present technology relates to systems and methods of executing personalized service transactions with Internet-accessible service providers, and, more particularly, to systems and methods utilizing three-dimensional (3D) reconstruction of a user's physical characteristics provided by a user mobile device to execute user-personalized service transactions over the Internet.

BACKGROUND

The number of electronic-based or "online" purchasing transactions between consumers and vendors/product/service providers has proliferated substantially over the last several years. Such transactions are often conducted on mobile devices that provide consumers with certain conveniences and efficiencies.

There are, however, certain issues that exist in conventional electronic-based consumer/provider environments. For example, the electronic purchases for consumer size-specific products/services, such as, apparel, footwear, headgear, gloves, etc. may require numerous interactions including the amount of sensitive information that is transmitted between consumers and vendor/provider server systems and returns and/or exchanges of mis-fitting products.

SUMMARY

Embodiments of the presently disclosed technology have been developed based on developers' appreciation of various issues associated with conventional implementations of user-personalized electronic transactions. In particular, there is a need for electronic devices that provide efficient methods and interfaces for conducting online transactions and linking user and vendor transactions. Such techniques can reduce the cognitive burden on a user thereby enhancing productivity. Further, such techniques can reduce processor and battery power otherwise wasted on redundant user inputs.

In accordance with a broad aspect of the present inventive concepts, there is provided a system for executing an electronic purchasing transaction between a user and a vendor on a mobile communication device for an item relating to the user's physical characteristics, in which the system comprises a processor for executing instructions initiated by user requests; a user body database configured to store three dimensional (3D) user body information containing user-specific 3D representations, measurements, and characteristics of the user body and/or body parts; a vendor database configured to store vendor-specific information identifying potential vendors containing items relevant to the stored 3D user body information; and a communication interface for establishing wireless communications with a potential vendor and external entities.

In view of the noted system elements and configuration, in response to a user request for an item, the processor executes a search in the vendor database and external entities for the requested item conforming to the stored 3D user body information and forwards search results to the user, wherein, when the search results do not identify a match to the requested item by a vendor, the processor forwards alternatives to the user for consideration based on information from the search results, and wherein, when the search results identify a match to the requested item by a vendor, the processor forwards a request for acceptance of the matched item to the user and upon acceptance, the processor executes the purchasing transaction with the vendor.

In related embodiments, there is provided a system for conducting electronic interactions between a user and a service provider on a mobile communication device related to physical profile data of the user, in which the system comprises a processor for executing instructions initiated by user requests; a three dimensional (3D) body scan and measurement module configured to execute 3D scans of the user's body and/or body parts to generate 3D representations, measurements, and characteristics of the scanned user's body and/or body parts; a user body database configured to store user physical profile data containing the 3D representations, measurements, and characteristics of the user's body/body parts along with user health information; and a communication interface for establishing secure wireless communications with a selected service provider and external entities.

In view of the noted system elements and configuration, upon establishing secure communications with the selected service provider, the user initiates the secure transfer of the user physical profile data to the selected service provider and, in response to the receipt of the user physical profile data, the service provider forwards periodic requests to the user for updated user physical profile data.

In accordance with another broad aspect of the present inventive concepts, there is provided a method for executing an electronic purchasing transaction between a user and a vendor on a mobile communication device for an item relating to the user's physical characteristics, in which the method comprises executing instructions, by a processor, initiated by user requests; storing, in a user body database, three dimensional (3D) user body information containing user-specific 3D representations, measurements, and characteristics of the user body and/or body parts; storing, in a vendor database, vendor-specific information identifying potential vendors containing items relevant to the stored 3D user body information; and establishing wireless communications, via a communication interface, with a potential vendor and external entities.

Given the noted method steps, in response to a user request for an item, the processor executes a search in the vendor database and external entities for the requested item conforming to the stored 3D user body information and forwards search results to the user, wherein, when the search results do not identify a match to the requested item by a vendor, the processor forwards alternatives to the user for consideration based on information from the search results, and wherein, when the search results identify a match to the requested item by a vendor, the processor forwards a request for acceptance of the matched item to the user and upon acceptance, the processor executes the purchasing transaction with the vendor.

In related embodiments, there is provided a method for conducting electronic interactions between a user and a service provider on a mobile communication device related to physical profile data of the user, in which the method comprises executing instructions, by a processor, initiated by user requests; executing, by a three dimensional (3D) body scan and measurement module, 3D scans of the user's body and/or body parts to generate 3D representations, measurements, and characteristics of the scanned user's body and/or body parts; storing, in a user body database, user physical profile data containing the 3D representations, measurements, and characteristics of the user's body/body parts along with user health information; and establishing, via a communication interface, secure wireless communications with a selected service provider and external entities.

Given the noted method steps, upon establishing secure communications with the selected service provider, the user initiates the secure transfer of the user physical profile data to the selected service provider and, in response to the receipt of the user physical profile data, the service provider forwards periodic requests to the user for updated user physical profile data.

In another broad aspect of the present technology, there is provided a computer-implemented method for determining user-item fit characteristics of an item for a user body part, the method comprising accessing a three-dimensional (3D) reconstructed model of the user body part, accessing information about one or more 3D reference models of the item, the information for each 3D reference model including respective dimensional measurement, spatial, and geometrical attributes, performing a 3D matching process based on the 3D reconstructed model and the accessed information of the one or more 3D reference models to determine a best-fitting 3D reference model from the one or more 3D reference models, integrating the best-fitting 3D reference model with the 3D reconstructed model to provide a 3D best fit representation, and displaying the 3D best fit representation along with visual indications of user-item fit characteristics.

In some embodiments of the computer-implemented method, the 3D matching process comprises a geometrical matching process, that for each 3D reference model includes aligning the 3D reference model with the 3D reconstructed model, and determining a distance between the 3D reference model and the 3D reconstructed model, the best-fitting 3D reference model minimizing the distance.

In some embodiments of the computer-implemented method, information about one or more 3D reference models contain landmarked indications of the dimensional measurement, spatial, and geometrical attributes, the 3D matching process comprising a landmark matching process that includes generating the one or more 3D reference models based on the landmarked indications, aligning the 3D reference model with the 3D reconstructed model, and determining a distance between the 3D reference model and the 3D reconstructed model, the best-fitting 3D reference model minimizing the distance.

In some embodiments of the computer-implemented method, accessing a 3D reconstructed model of the user body part comprises capturing, by an imaging device, a plurality of images of the user body part, and generating the 3D reconstructed model representative of the user body part based on the plurality of images.

In some embodiments of the computer-implemented method, the computer-implemented method further comprises associating the 3D reconstructed model with a body part category based on instructions received from a user, and accessing information about one or more 3D reference models of the item is based on the instructions.

In some embodiments of the computer-implemented method, the computer-implemented method further comprises, subsequent to accessing a 3D reconstructed model of the user body part, executing an object recognition algorithm on the 3D reconstructed model to identify the user body part and determine dimensional measurement, spatial, and geometrical attributes thereof.

In some embodiments of the computer-implemented method, accessing information about one or more 3D reference models comprises selecting the one or more 3D reference models from a database of 3D reference models based on an output of the object recognition algorithm.

In some embodiments of the computer-implemented method, the computer-implemented method further comprises adjusting, based on instructions received from a user, a position of the best-fitting 3D reference model relative to the 3D reconstructed model.

In some embodiments of the computer-implemented method, the position of the best-fitting 3D reference model is adjustable among a plurality of pre-defined positions relative to the 3D reconstructed model.

In some embodiments of the computer-implemented method, the computer-implemented method further comprises, subsequent to displaying the 3D best fit representation along with visual indications of user-item fit characteristics identifying, based on instructions received from a user, a user-selected 3D reference model among the one or more 3D reference models such that the user-selected 3D reference model is identified as a current best-fitting 3D reference model, integrating the user-selected 3D reference model with the 3D reconstructed model to provide a 3D user-selected representation, and displaying the 3D user-selected representation along with visual indications of user-item fit characteristics.

In some embodiments of the computer-implemented method, the visual indications of user-item fit characteristics represent local voids and local collisions between the best-fitting 3D reference model and the 3D reconstructed model, a local void being identified by a local gap between the best-fitting 3D reference model and the 3D reconstructed model, a local collision being identified by the 3D reconstructed model locally overlapping the best-fitting 3D reference model.

In some embodiments of the computer-implemented method, areas where the user-item fit characteristics are determined in pre-defined target areas associated with the best-fitting 3D reference model or the 3D reconstructed model.

In some embodiments of the computer-implemented method, the visual indications of user-item fit characteristics represent local voids having a corresponding volume above a first threshold, and local collisions having a corresponding volume above a second threshold.

In some embodiments of the computer-implemented method, at least one of the first threshold and the second threshold is based on the pre-defined target area.

In some embodiments of the computer-implemented method, information about the one or more 3D reference models comprises 3D scans, 3D point clouds, 3D meshes, voxels, continuous functions, Computer-aided design (CAD) files or a list of body part landmarks.

In some embodiments of the computer-implemented method, information about the one or more 3D reference models further comprises one or more identifiers selected from a group of identifies comprising: labels, semantic labels, object category, brand information and metadata.

In yet another aspect of the present technology, there is provided a system for determining fitting characteristics of an item for a user body part, the system comprising a processor and a memory communicably connected to the processor, the memory comprising instructions which, upon being executed by the processor, cause the processor to access a three-dimensional (3D) reconstructed model of the body part, access information about one or more 3D reference models of the item, the information for each 3D reference model including respective dimensional measurement, spatial, and geometrical characteristics, perform a 3D matching process based on the 3D reconstructed model and the accessed information about the one or more 3D reference models to determine a best-fitting 3D reference model from the one or more 3D reference models, integrate the best-fitting 3D reference model with the 3D reconstructed model to provide a 3D best fit representation and display, on a display device communicably connected to the processor, the 3D best fit representation along with visual indications of user-item fit characteristics.

In some embodiments of the system, the processor is communicably connected with a service provider device, and access information about one or more 3D reference models of the item comprises receiving, from the service provider device, the information about one or more 3D reference models.

In some embodiments of the system, the processor is communicably connected with an imaging device configured to capture images, the processor being further configured to, in order to access a 3D reconstructed model of the body part, cause, by the processor, the imaging device to capture a plurality of images of the body part, and generate, by the processor, the 3D reconstructed model based on the plurality of images.

In some embodiments of the system, the 3D matching process comprises a geometrical matching process, the processor being configured, for each 3D reference model, align the 3D reference model with the 3D reconstructed model, and determine a distance between the 3D reference model and the 3D reconstructed model, the best-fitting 3D reference model minimizing the distance.

In some embodiments of the system, information about one or more 3D reference models contain landmarked indications of the dimensional measurement, spatial, and geometrical attributes, the processor being configured to, upon executing the 3D matching process, generate the one or more 3D reference models based on the landmarked indications, align the 3D reference model with the 3D reconstructed model; and determine a distance between the 3D reference model and the 3D reconstructed model, the best-fitting 3D reference model minimizing the distance.

In some embodiments of the system, the processor is further configured to associate the 3D reconstructed model with a body part category based on instructions received from a user, and access information about one or more 3D reference models of the item is based on the instructions.

In some embodiments of the system, the processor is further configured to, subsequently to accessing a 3D reconstructed model of the user body part, execute an object recognition algorithm on the 3D reconstructed model to identify the user body part and determine dimensional measurement, spatial, and geometrical attributes thereof.

In some embodiments of the system, upon accessing information about one or more 3D reference models, the processor is further configured to select the one or more 3D reference models from a database of 3D reference models based on an output of the object recognition algorithm.

In some embodiments of the system, the processor is further configured to adjust, based on instructions received from a user, a position of the best-fitting 3D reference model relative to the 3D reconstructed model.

In some embodiments of the system, the position of the best-fitting 3D reference model is adjustable among a plurality of pre-defined positions relative to the 3D reconstructed model.

In some embodiments of the system, the processor is further configured to, subsequently to displaying the 3D best fit representation along with visual indications of user-item fit characteristics, identify, based on instructions received from a user, a user-selected 3D reference model among the one or more 3D reference models such that the user-selected 3D reference model is identified as a current best-fitting 3D reference model, integrate the user-selected 3D reference model with the 3D reconstructed model to provide a 3D user-selected representation; and display the 3D user-selected representation along with visual indications of user-item fit characteristics.

In some embodiments of the system, the visual indications of user-item fit characteristics represent local voids and local collisions between the best-fitting 3D reference model and the 3D reconstructed model, a local void being identified by a local gap between the best-fitting 3D reference model and the 3D reconstructed model, a local collision being identified by the 3D reconstructed model locally overlapping the best-fitting 3D reference model.

In some embodiments of the system, areas where the user-item fit characteristics are determined in pre-defined target areas associated with the best-fitting 3D reference model or the 3D reconstructed model.

In some embodiments of the system, the visual indications of user-item fit characteristics represent local voids having a corresponding volume above a first threshold, and local collisions having a corresponding volume above a second threshold.

In some embodiments of the system, at least one of the first threshold and the second threshold is based on the pre-defined target area.

In some embodiments of the system, information about the one or more 3D reference models comprises 3D scans, 3D point clouds, 3D meshes, voxels, continuous functions, Computer-aided design (CAD) files or a list of body part landmarks.

In some embodiments of the system, information about the one or more 3D reference models further comprises one or more identifiers selected from a group of identifies comprising: labels, semantic labels, object category, brand information and metadata.

Other aspects and embodiments of the instant inventive concepts will be provided in detail by the present disclosure.

BRIEF DESCRIPTION OF THE DRAWINGS

The features, aspects, and advantages of the the present disclosure will become better understood with regard to the following description, appended claims, and accompanying drawings, in which:

DETAILED DESCRIPTION

Figure 1:
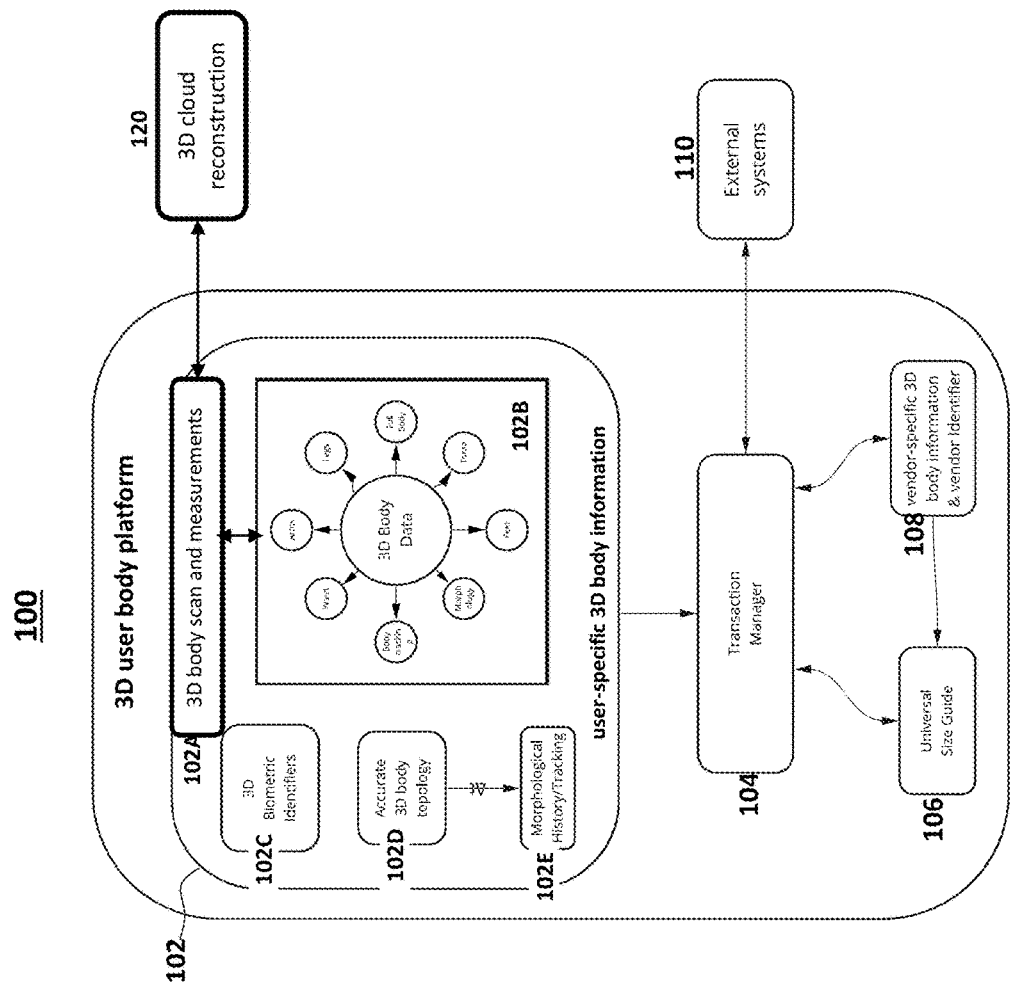
FIG. 1 depicts a high-level functional block diagram of 3D user physical characteristics-based services transaction platform, in accordance with the embodiments of the present disclosure.

Various exemplary embodiments of the described technology will be described more fully hereinafter with reference to the accompanying drawings, in which exemplary embodiments are shown. The present inventive concept may, however, be embodied in many different forms and should not be construed as limited to the exemplary embodiments set forth herein. Rather, these exemplary embodiments are provided so that the disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular exemplary embodiments and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules, which are implied to be software, may be represented herein as any combination of flowchart elements or other elements indicating the specified functionality and performance of process steps and/or textual description. Such modules may be executed by hardware that is expressly or implicitly shown. Moreover, it should be understood that these modules may, for example include, without being limitative, computer program logic, computer program instructions, software, stack, firmware, hardware circuitry or any combinations thereof that are configured to provide the required capabilities and specified functionality.

Given this understanding, the inventive aspects and embodiments of the present technology are presented in the following disclosures.

FIG. 1 depicts a high-level functional block diagram of 3D user physical characteristics-based services transaction platform 100, in accordance with the embodiments of the present disclosure. Platform 100 is designed to provide an infrastructure that expedites user electronic/online transactions by minimizing user interactions in procuring items/services personalized or customized to user needs based on user physical attributes and preferences.

As shown, 3D user transaction platform 100 incorporates user-specific body information module 102, transaction manager module 104, universal size guide module 106, and vendor-based body information and vendor identifier module 108. The 3D user transaction platform 100 also communicates with 3D cloud reconstruction services 120 for 3D physical body characteristics processing and external systems 110 for transaction processing. The elements of the 3D user transaction platform 100 will be described in detail below.

I. 3D User Hardware Platform

Figure 2:
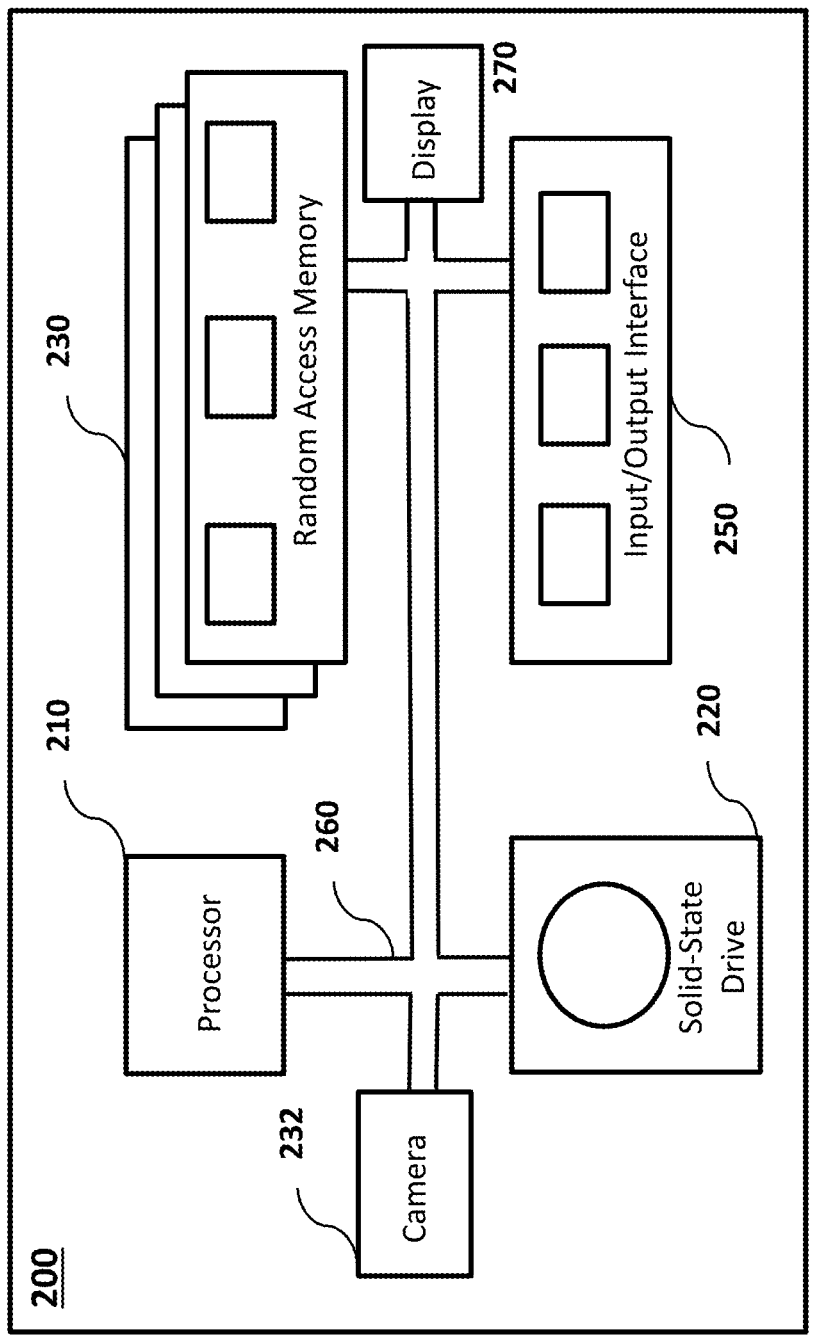
FIG. 2 depicts a user computing/communication device for incorporating the 3D user physical characteristics platform, in accordance with the embodiments of the present disclosure.

In some embodiments, the 3D user transaction platform 100 may be implemented by a user computing and communication-capable device 200, such as, but not limited to, a mobile device, tablet device, server, controller unit, control device, monitoring device, etc. As shown in FIG. 2, in accordance with the embodiments of the present disclosure, the user computing/communication device 200 may employ various hardware components including one or more single or multi-core processors collectively represented by a processor 210, solid-state drive 220, random access memory 230, camera 232 and input/output interface 250. Communication between the various components of device 200 may be enabled by one or more internal and/or external buses 260 (e.g., a PCI bus, universal serial bus, IEEE 1394 "Firewire" bus, SCSI bus, Serial-ATA bus, ARINC bus, etc.), to which the various hardware components are electronically coupled.

The processor 210 may be a general-purpose or a special-purpose processor that controls operation of user device 200 in which the solid-state drive 220 stores program instructions suitable for being loaded into the random access memory 230 and executed by the processor 210 for executing generation of 3D representation of objects. For example, the program instructions may be part of a library or an application.

The camera 232 of user device 200 may be used to acquire images or the video sequence of a user's physical characteristics, which may then be used to generate a 3D representation of the user's characteristics that may be presented by the display 270 of user device 200, in accordance with the present disclosures.

The input/output interface 250 may allow enabling communication/networking capabilities such as wire or wireless access. As an example, the input/output interface 250 may comprise a networking interface such as, but not limited to, a network port, a network socket, a network interface controller, transceiver, and the like to effect communications. Multiple examples of how the networking interface may be implemented will become apparent to the person skilled in the art of the present technology. For example, but without being limiting, the networking interface may implement specific physical layer and data link layer standard such as Ethernet, Fibre Channel, Wi-Fi or Token Ring. The specific physical layer and the data link layer may provide a base for a full network, allowing communication among small groups of computers on the same local area network (LAN) and large-scale network communications through routable protocols, such as Internet Protocol (IP).

II. User-Specific Body Information Module

Returning to FIG. 1, the user-specific body information module 102 acquires a 3D representation of the user's characteristics via the 3D body scan/measurement module 102A and stores the 3D representations of those user-specific body characteristics in the 3D body data module 102B of the platform 100.

The operations of the 3D body scan/measurement module 102A are configured to acquire, process, and generate 3D representations of the user's physical characteristics. These operations are detailed in the commonly-owned EP applications: WO2020240497, entitled "SYSTEM AND METHOD OF GENERATING A 3D REPRESENTATION OF AN OBJECT," filed on May 29, 2020; EP 20211729.7, entitled "SYSTEM AND METHOD FOR DEPTH MEASUREMENT," filed on Dec. 3, 2020; and EP 20217316.7 entitled "SYSTEM AND METHOD FOR GENERATING A 3D POINT CLOUD FROM A SINGLE-LENS RED-GREEN-BLUE (RGB) CAMERA," filed on Feb. 24, 2020, the contents of all cited applications being incorporated by reference in their entireties.

Figure 3C:
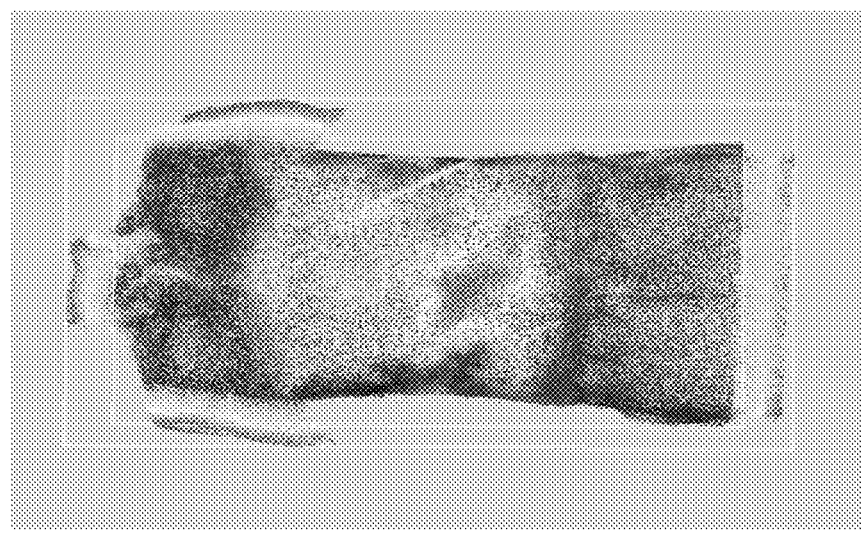
FIGS. 3A-3H depict various displays of the 3D user physical characteristics platform, in accordance with the embodiments of the present disclosure.
Figure 3B:
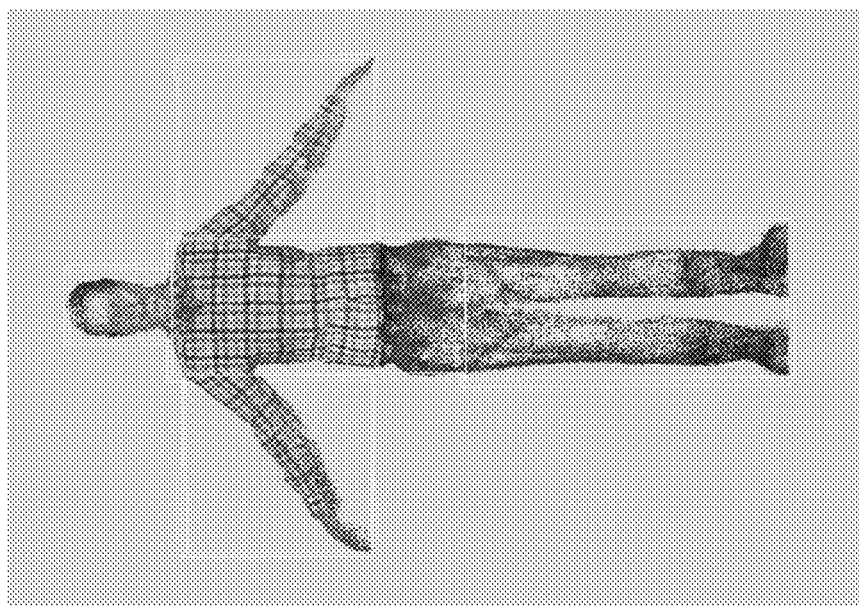
Figure 3A:
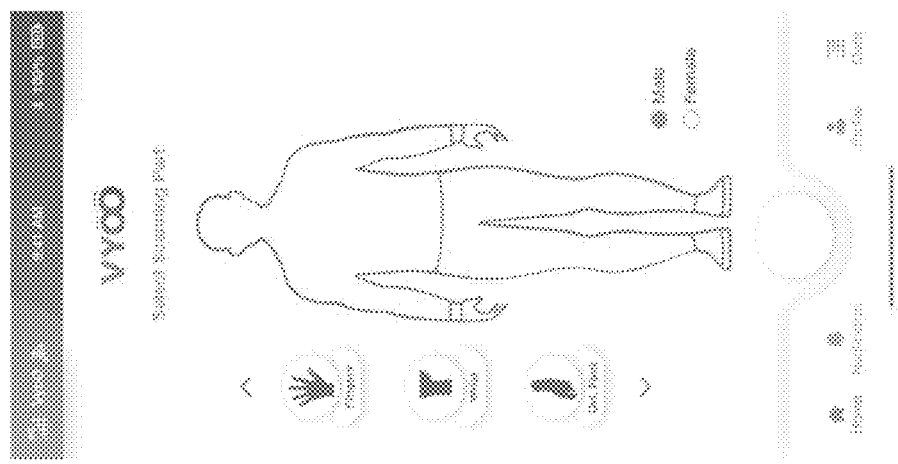

By way of a brief non-limiting review, user activates a 3D body scan application page on device 200, such as, the sample application introduction page 310 shown in FIG. 3A, in accordance with the embodiments of the present disclosure. The 3D body scan application page 310 provides users with instructions and options to execute full body or body part scan. It is contemplated that the 3D body scan application page 310 is associated with at least the 3D body scan/measurement module 102A and other modules and components of device 200.

Figure 3G:
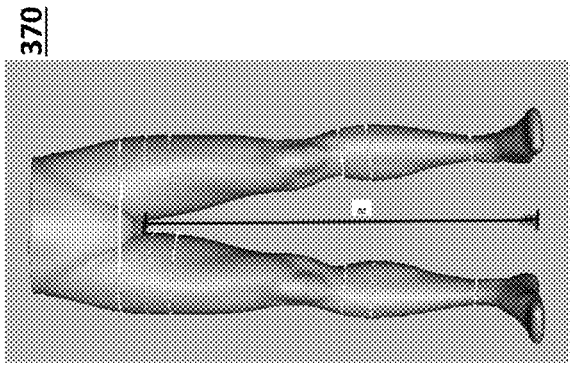
Figure 3H:
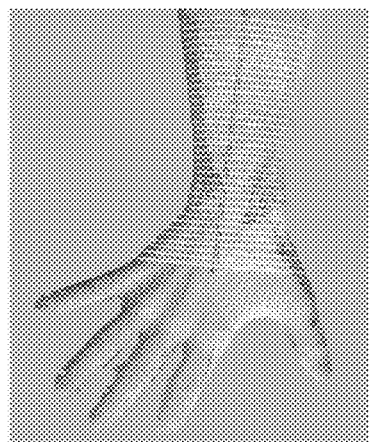

Upon user input to initiate scanning operations in the 3D body scan application page 310, the 3D user-specific body information module 102 activates the camera 232 of user device 200 to capture images or video sequences of a user's body or body parts, as depicted in FIG. 3B, in accordance with the embodiments of the present disclosure. The images/video sequences are subjected to one or more processing methods and techniques to extract anatomical features data of interest and generate relevant points and artifacts, such as, for example, the depicted heat mapping of an upper torso (see, FIG. 3C), the depicted lower body A scan with markers (see, FIG. 3D), and the depicted hand B scan with sectioned markers (see, FIG. 3E).

The 3D user-specific body information module 102 is also configured with a number of user scanning options, which upon selection, triggers module 102 to execute logical operations corresponding to the selection option. For example, a user may select an "automatic update" option that prompts the user to re-scan body parts at a certain frequency intervals. The frequency interval may be set based on current or foreseen usage of the 3D body information (e.g., online retail, fitness progress, health-related applications, etc.) and may be adjusted by the user at any time for any reason.

Figure 3F:
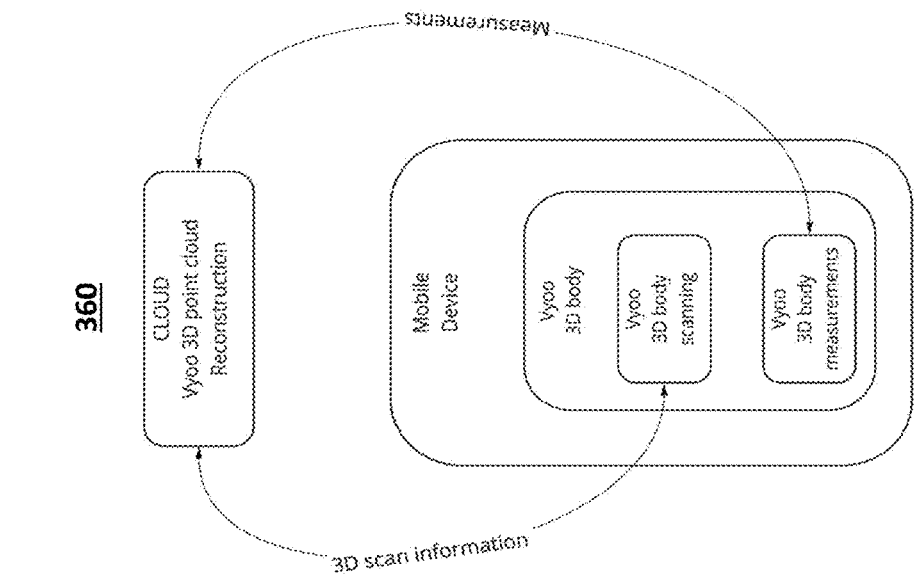
Figure 3D:
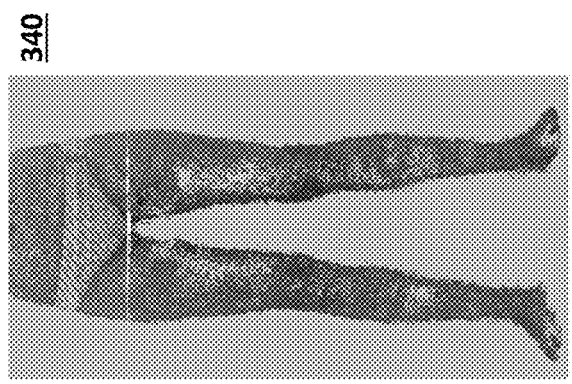
Figure 3E:
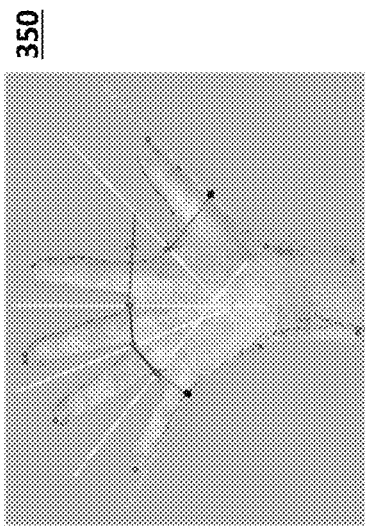

As shown in FIG. 3F, in accordance with the embodiments of the present disclosure, the image-based points/artifacts are then forwarded to a 3D point cloud 120 to be further processed and reconstructed. The 3D point cloud 120 employs numerous filtering, denoising, smoothing, interpolation, and spatial techniques to increase the accuracy of the points/artifacts defining the relevant data for the 3D point cloud reconstruction and/or reduce the number of points which are not relevant to object itself.

It will be appreciated that the 3D point cloud 120 is contemplated to be embodied in a virtualized "cloud" computing environment that comprises the use of distributed resources, such as, for example, data storage services, processing servers, databases, networking capabilities, etc. The cloud environment accommodates for and adjusts the processing power and/or memory resources required to execute the processes of the present disclosure.

Upon receipt of the image-based body/body parts points/artifacts, 3D point cloud 120 reconstruction performs alignment, translation, rotation, and/or scaling operations within a geometrical spatial coordinate system. After processing and applying various corrective and fine-tuning techniques, the 3D point cloud 120 renders a 3D representation with measurement data of the user's scanned body/body part, such as, for example, the depicted smoothed lower body A scan with measurement markers for the ankle, calf, knee, thigh, and hips (see, FIG. 3G), and the depicted smoothed hand B scan with meshed wrist/forearm to indicate measurement segments (see, FIG. 3H). The 3D representation with measurement data is subsequently forwarded to 3D body scan/measurement module 102A of the user-specific body information module 102.

In at least some embodiments, an object recognition MLA is executed on the 3D point cloud 120 and a 3D model template is morphed onto the 3D point cloud 120, a selection of the 3D model template to be morphed being based on an output of the object recognition MLA. As such the morphed 3D model template may be referred to as a 3D reconstructed model of the user body part. The morphing of a selected 3D model template may be performed using the teachings of operations detailed in the commonly-owned EP applications: WO 2020/240497, entitled "SYSTEM AND METHOD OF GENERATING A 3D REPRESENTATION OF AN OBJECT," filed on May 29, 2020.

The 3D body scan/measurement module 102A receives the 3D representation and measurement data, collectively referred to as "3D body data," that is then stored and managed by 3D body data module 102B. The body data may be parsed by the 3D body data module 102B into information "satellites" that are body-part specific, such as, for example, head, legs, arms, feet, fingers, hands, torso, etc.

Returning to FIG. 1, the user-specific body information module 102 may also employ a 3D biometric identifier module 102C to store and manage personal biometric identification features; 3D body topology 102D to store and manage relatively unchanging anatomical attributes; and morphological history/tracking module 102E to track changes in body shapes and sizes. As such, these modules may store user-body information, such as, for example, body measurements and dimensions, weight, health factor, lifestyle, skin color, facial identification features, finger/hand prints, eye color, retinal information, birthmarks, tattoos, dental identification features, etc.

Figure 4:
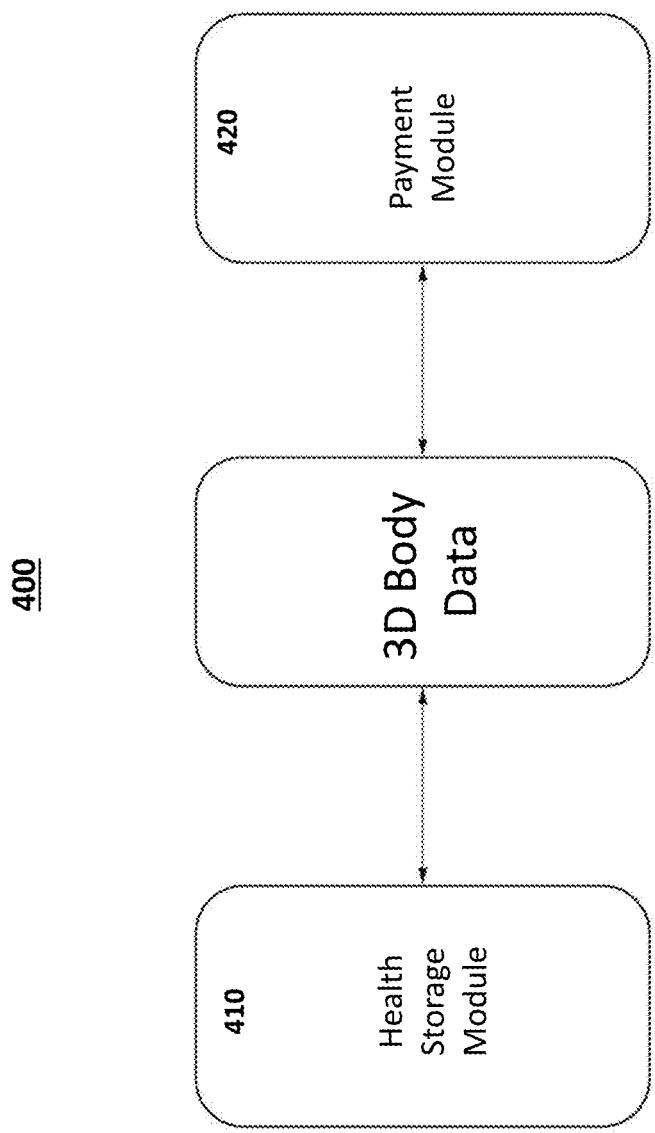
FIG. 4 depicts the 3D user physical characteristics platform secure storage of users 3D body data and financial payment information on user computing/communication device.

In some embodiments, as depicted in FIG. 4, in accordance with the embodiments of the present disclosure, the user's 3D body data may be stored in secure health storage modules/applications 420 provided by manufacturers of computing/communication device 200 or third party developers (e.g., Apple Health, FitBit, etc.). Relatedly, the user's confidential financial payment information and credentials may also be stored in secure payment modules/applications 420 provided by manufacturers of computing/communication device 200 or third party developers (e.g., Apple Wallet, PayPal, etc.). While these health storage and payment information modules contain the security features to protect and maintain privacy of the user, it is contemplated that platform 100 may incorporate other internal security measures to enhance user and 3D body data privacy.

III. Transaction Manager Module and Universal Size/Vendor-Specific Information

The 3D user transaction platform 100 incorporates transaction manager module 104 that operates to manage and execute transactions between users and service providers. The transaction manager module 104 is configured to communicate with platform 100 internal modules along with electronically communicate with external systems and vendors/retailers. The transaction manager module 104 is further configured to initiate and execute internal/external searches as well as securely store user payment, debit/credit card information, and private payment confirmation credentials.

As shown in FIG. 1, transaction manager module 104 communicates with universal size guide module 106 and vendor-specific 3D body information/vendor identifier module 108 to initiate the execution of internal searches for user requested items. The universal size guide 106 is configured to filter and aggregate item data provided by vendors/retailers via vendor-specific 3D body information/vendor identifier 108 in accordance with user sizes/measurements provided by the stored user 3D body data. The vendor-specific 3D body information/vendor identifier 108 stores vendor-specific information and user-specific information for various potential vendors based on information collected from previous interactions or inquiries with vendors or potential vendors.

The aggregated item data may be managed and filtered in accordance with user-indicated fashion/brand preferences, user comments, and/or user suitability ratings based on prior item offerings, vendor/retailor recommendations, brand labels, etc. The item data may also be processed to account for different sizing systems, such as, for example, US, UK, EU, metric, imperial, etc. The universal size guide 106 may also be used in health provider applications, such as, for example, medical offerings requiring high-precision body data, such as, for example, orthotics, prosthetics, optometric products, etc.

Transaction manager module 104 may further be configured to communicate with external systems 110 to execute searches, in accordance with the stored 3D body data, that are external to the data stored by vendor-specific 3D body information/vendor identifier module 108.

Having described the elements of the 3D user physical characteristics-based services transaction platform 100, the operations of platform 100 will be described below.

IV. 3D User Interaction & Transaction Platform Operations

As discussed above, platform 100 stores the 3D body data comprising 3D representations and measurements of a user's body/body parts in the 3D body data module 102B or secure modules or applications provided by device manufacturers. Platform 100 also stores vendor-specific information and/or user-specific information for various potential vendors that may have been collected from previous interactions in vendor-specific 3D body information module 108.

Figure 5:
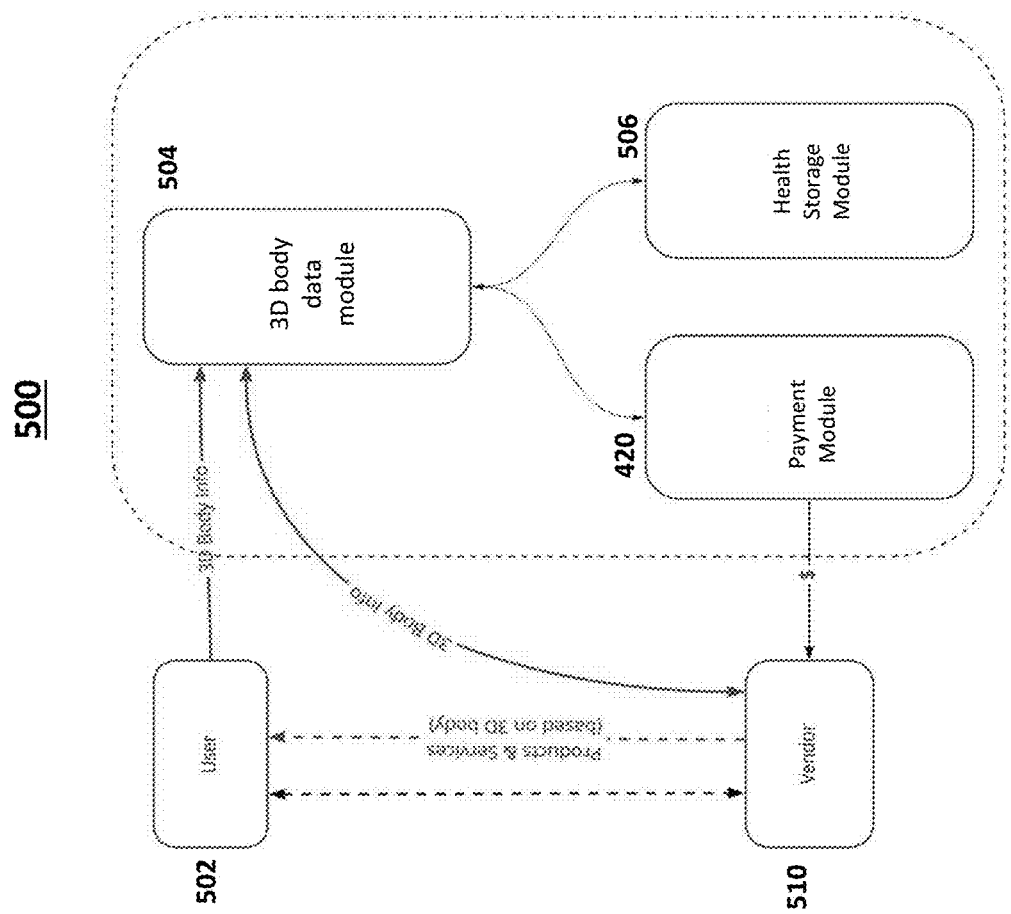
FIG. 5 illustrates a representative high-level interaction configuration overview between a user and key elements of the 3D user physical characteristics platform, in accordance with various embodiments of the present disclosure.

As such, FIG. 5 illustrates a representative high-level interaction configuration overview 500 between a user and key elements of platform 100, in accordance with various embodiments of the present disclosure. As shown, at block 502, a user is configured to communicatively interact with 3D body data module 504 to update, supplement, and access the stored 3D body data. The user is also configured to communicatively interact under secure channels with external entities, such as, for example, service providers and vendors, as indicated by block 510.

In turn, the 3D body data module 102B is configured to communicatively interact with secure health storage modules/applications 410 (e.g., Apple Health, FitBit, etc.) to securely store the latest updated user 3D body data, as indicated by block 506. The 3D body data module 102B is also configured to communicatively interact with secure payment modules/applications 420 (e.g., Apple Wallet, PayPal, etc.) store the latest user updated payment information, as indicated by block 508 as well as under secure channels with external entities, such as, for example, service providers and vendors, as again indicated by block 510.

Finally, as indicated by blocks 508, 510, the secure payment modules/applications 420 are configured to communicatively interact with external entities, such as, for example, service providers and vendors, under secure channels.

Figure 6:
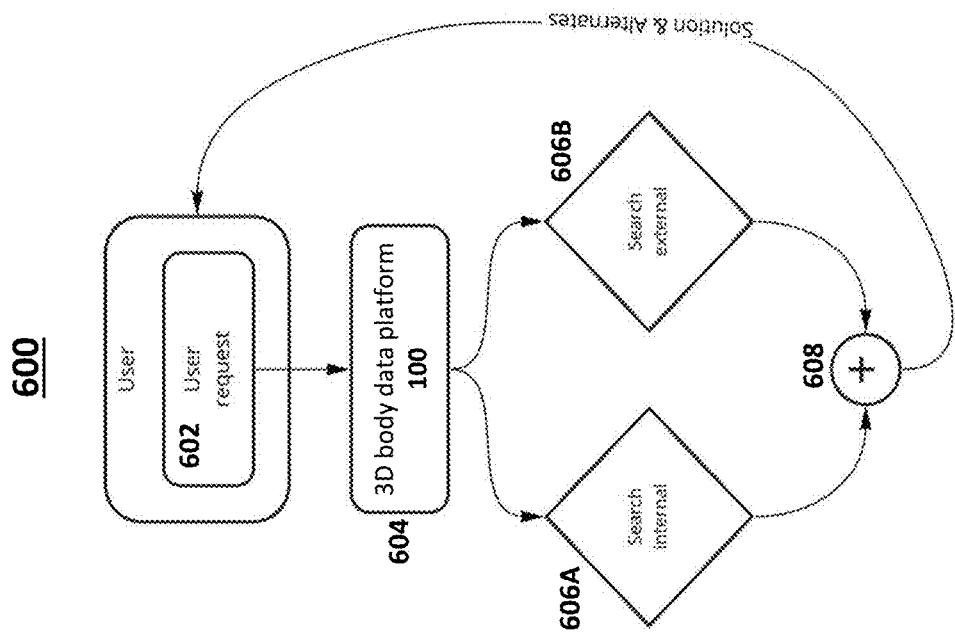
FIG. 6 illustrates a representative process flow of the 3D user physical characteristics platform for executing searches for an item, in accordance with various embodiments of the present disclosure.

Given the high-level interaction configuration overview 500 discussed above, FIG. 6 illustrates a representative process flow 600 of user 3D data platform 100 for executing searches for an item based on the stored 3D body data, in accordance with various embodiments of the present disclosure. The process flow 600 expedites user item searches by minimizing user interactions in searching for items/services that are personalized/customized to user needs based on user physical attributes and preferences.

As shown, at process task 602 a user submits a request to search for a particular item to platform 100. The platform 100 is configured to handle a broad range of search requests—from general requests (e.g., "footwear") to specific detailed requests (e.g., "brand X cross-training shoe, model Y, white or blue color").

At process task 604, platform 100 processes the request by determining the user-specific attributes and parameters of the user 3D body data stored in the 3D body data module 102B that correspond to the requested item. Such user-specific 3D body data attributes/parameters may, for example, contain body part dimensions, measurements, and shapes for the requested item(s).

At process task 606A, platform 100 executes an internal search in vendor-specific 3D body information module 108 for vendors/potential vendors capable of providing the requested item(s), in accordance with the user-specific 3D body data parameters. Concurrently, at process task 606B, platform 100 communicates with external systems 110 to execute an external search for the requested item(s), in accordance with the user-specific 3D body data parameters. The external search query for the requested item(s) based on the user 3D body data parameters may be implemented by any of the known techniques in the art accessing Internet-related sites.

At process task 608, the item results of both the internal search process step 606 and external search process task 608 that match the user 3D body data parameters are aggregated and forwarded to the user. The forwarding of the matching items is preferably visually presented to the user with as much pertinent information as available. As an example, the pertinent information may comprise user-item fit characteristics of the item for a given user body part. A method for determining the user-item fit characteristics is described in greater detail further below.

In the event that neither the internal search process task 606A nor the external search process task 606B search provide item results that match the user request, platform 100 may be configured to process and filter the information collected by the internal and external searches to suggest alternative items to the user for further consideration.

Figure 7:
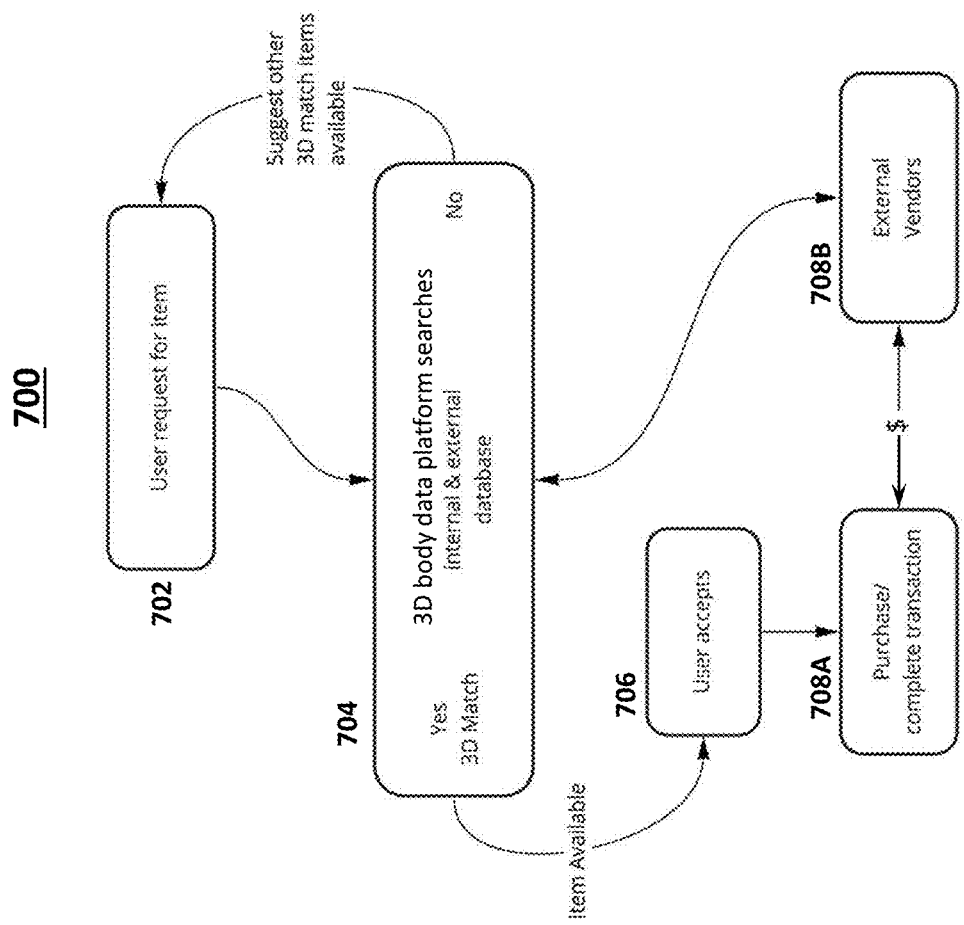
FIG. 7 illustrates a representative process flow of the 3D user physical characteristics platform for executing an electronic purchase transaction for a requested item.

FIG. 7 illustrates a representative process flow 700 of platform 100 for executing an electronic purchase transaction for a requested item with a vendor based on the stored 3D body data, in accordance with various embodiments of the present disclosure. The process flow 700 expedites user electronic/online transactions by minimizing user interactions in searching and procuring items/services that are personalized/customized to user needs based on user physical attributes and preferences.

As shown, at process task 702 a user submits a request for an item to platform 100. At process task 704, platform 100 processes the request by executing the internal and external searches based on the stored 3D body data, as discussed above relative to the item search process flow 600 description. If the results of the internal and external searches provide no match for the requested item, platform 100 suggests alternative items to the user for consideration, as also discussed as discussed above relative to the item search process flow 600 description.

If the results of the internal and external searches provide one or more matches for the requested item, platform 100 forwards the matching items results to the user with a request for the user to accept/select or reject the one or more matched items. The forwarding of the matching items is preferably visually presented to the user with as much pertinent information as available. As will be described in greater detail below, the user may be displayed with a representation of the matching item in combination with the user body part or, in other words, the matching item is "integrated" with the user body part along with visual indications of user-item fit characteristics. In some embodiments, the user may further adjust a position and/or a size of the matching item. At process task 706, the user indicates the acceptance/selection of the one or more of the matched items to platform 100.

Upon indication of user acceptance/selection of one or more of the matched items, at process task 708A, platform 100 initiates the electronic purchase transaction of the accepted/selected item(s) by invoking transaction manager module 104. As discussed above, transaction manager module 104 is configured to electronically communicate with vendors/retailers, manage the execution and consummation of transactions between users and external vendors/retailers, and securely store user payment/confirmation credentials.

Accordingly, at process task 708A, transaction manager module 104 establishes electronic communications with the external vendors/retailers offering the user selected item(s) and initiates the electronic purchase of the user selected item(s) by providing a request to the vendors/retailers to electronically purchase the specific selected item(s). In response to the request, at process task 708B, the external vendors/retailers may respond to transaction manager module 104 with requests for user name, user delivery address, delivery date options, user payment information, etc. Upon user approval, transaction manager module 104 provides the requested information to the vendor(s)/retailer(s) to execute and consummate the electronic purchase transaction of the user selected item(s) and receive confirmation from the vendors/retailers of the same.

Figure 8:
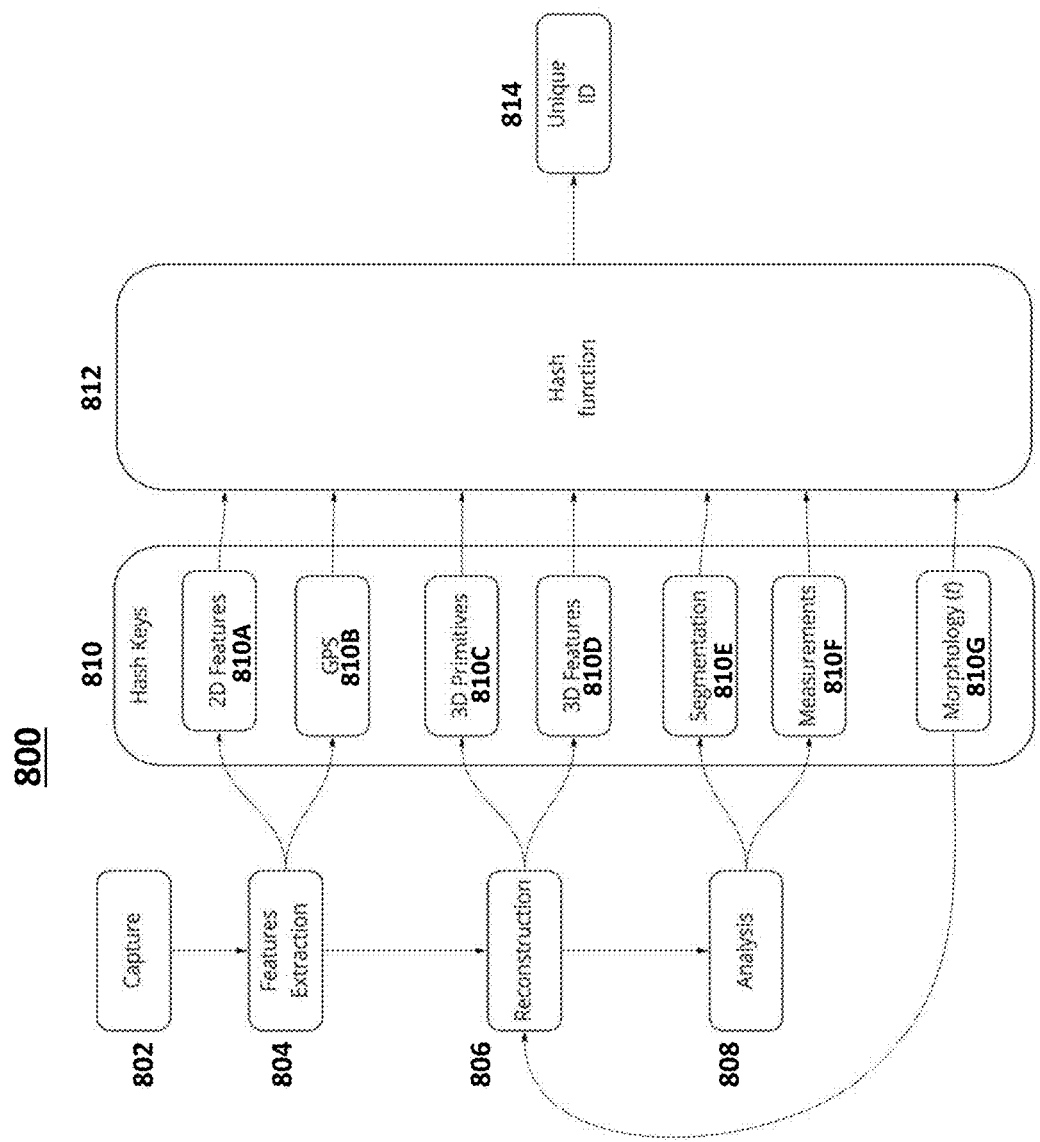
FIG. 8 illustrates a representative process flow of the 3D user physical characteristics platform for generating a unique user ID based on the 3D user biometric data extraction, in accordance with various embodiments of the present disclosure.

FIG. 8 illustrates a representative process flow 800 of platform 100 for generating a unique user ID based on the 3D user biometric data extraction, in accordance with various embodiments of the present disclosure. Generally speaking, various biometeric data attributes are forwarded to a hash key unit 810 to assign the data attributes with corresponding hash keys values. The corresponding attribute hash keys are then fed to a hash function unit 812 to convert the hash key values into hash code(s).

Process flow 800 commences at process block 802, where platform 100 captures images/video sequences of a user's body/body parts, as discussed above. At process block 804, platform 100 extracts anatomical features data to generate relevant points and artifacts of a body part, as discussed above. The relevant body part points/artifacts data are supplied to 2D hash key module 810A and GPS hash key module 810B to be assigned hash key values indicative of body part data and location of captured data, respectively.

It will be appreciated that the specific data supplied to modules 810A and 810B for hash key value assignment may include or be based one or more of the following data elements: GPS location of capture, Optical Character Recognition (OCR) data, color data, color histogram data, texture data, corner descriptor data, edge data, shape data, Histogram of Oriented Gradients (HOG)-based keypoint data (including extensions), Scale Invariant Feature Transform (SIFT)-based keypoint data (including extensions PCA-SIFT), Binary Robust Independent Elementary Features (BRIEF) data, Binary Robust invariant scalable keypoint (BRISK) data, Oriented FAST and rotated BRIEF (ORB) data, Local Binary Patterns (LBP) data, Center-Symmetric Local Binary Pattern (CS-LBP) data, Local Ternary Pattern (LTP) data, Extended Local Ternary Pattern (ETLP) data, Local Tetra Patterns (LTrP) data, and Fast Retina Keypoint (FREAK) data.

Returning to FIG. 8, at process block 806, platform 100 performs reconstruction processing of the body part points/artifacts to generate a 3D representation of the relevant body part with measurement data, as discussed above. The generated 3D body part representation is supplied to 3D primitives hash key module 810C and 3D features module 810D to be assigned hash key values indicative of 3D body part data and 3D features data, respectively. The 3D specific data supplied to modules 810C and 810D for hash key value assignment may include one or more of the following data elements: volume data, dimension data, 3D primitive constructs (e.g., planes, spheres, cylinders, cubes, torus, connectivity graphs, etc.). Additionally, at process block 806, platform 100 receives updated morphology data from morphology module 810G that calculates the specific changes of 3D body part data over time, which is also subjected to hash key values.

At a process block 808, platform 100 performs analytical segmentation and measurement processing of the 3D body part representation to segment portions of the body parts and provide accurate measurement data of the segmented portions, as discussed above. The segmented portion data is supplied to the 3D segmentation hash key module 810E and the 3D segment measurements module is supplied to the 810D to be assigned hash key values indicative of 3D body part segmentation data and 3D segmentation measurement data, respectively.

The assigned hash key values 810A-810G are then fed to a hash function at process block 812. It will be appreciated that the hash function may, for example, comprise universal hash functions, cryptographic hash functions, modulo reduction hash functions, bit masked hash functions, salted hash functions, or combinations thereof.

Process block 812 then processes the hash key values by applying the hash function to generate a hash code representing a unique user physical identifier (e.g., unique user body ID) that is based on user biometric data. The unique body ID may further be associated or correlated with a user device identifier and/or user device password credentials to expedite authentication processes and minimize user interaction tasks.

V. 3D Virtual Fit-on

In certain aspects, the presently-disclosed technology provides a process for determining user-item fit characteristics of an item for a user body part. Visual indications of the user-item fit characteristics may be further displayed to the user to assist the user in evaluating a level of comfortability of the item. In other words, the present technology provides a virtual fit-on process resulting in visual indications about how the item would actually be worn at a given user body part and felt by the user. As such, the virtual fit-on process provides information about an appearance of the item on the user body part along with information about the user-item fit characteristics (e.g. comfortability levels).

Figure 9:
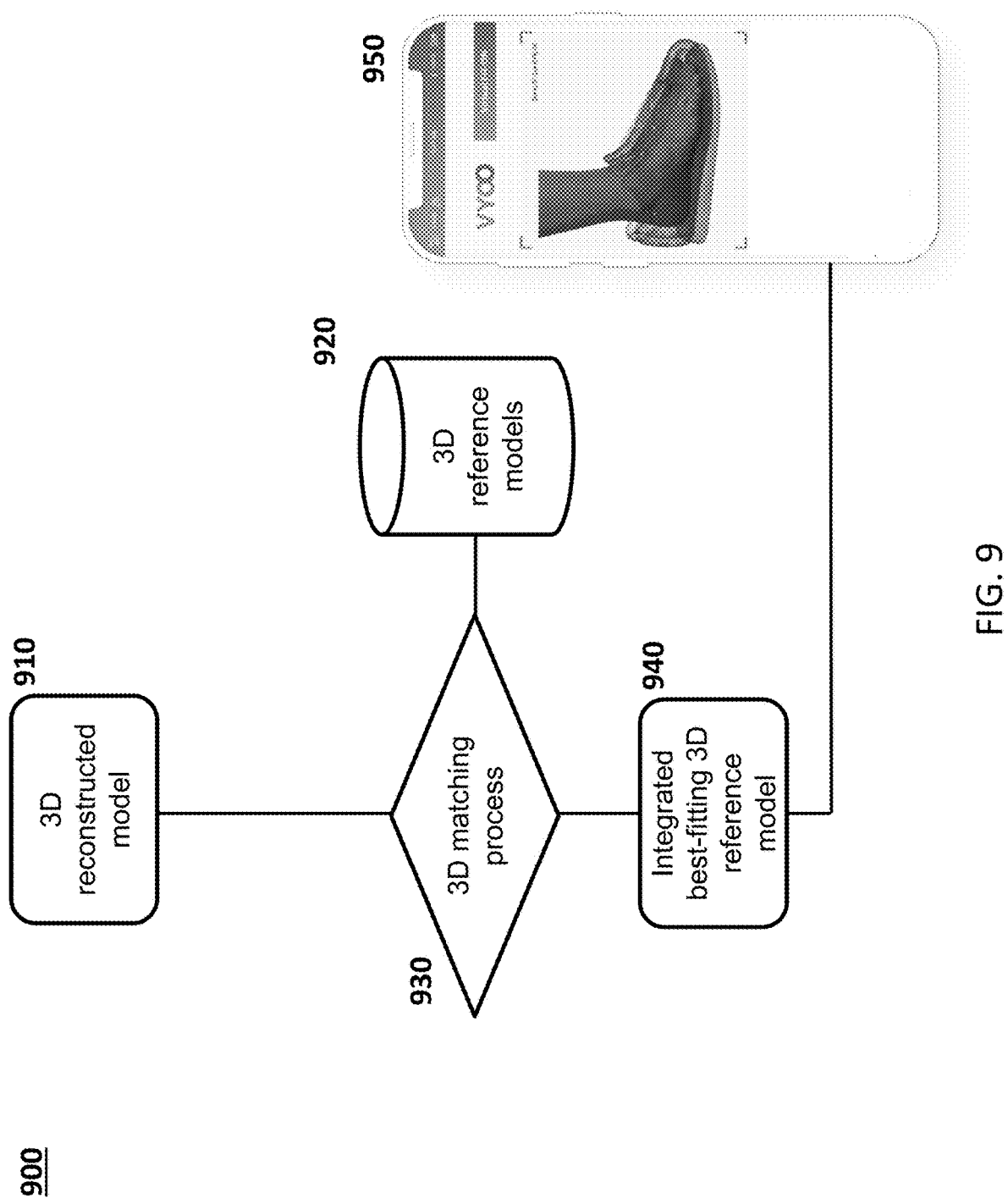
FIG. 9 illustrates a representative process flow of the 3D user physical characteristics platform for determining and displaying user-item fit characteristics to a user, in accordance with various embodiments of the present disclosure.

With this said, FIG. 9 illustrates a representative process flow 900 of platform 100 for determining user-item fit characteristics of an item for a user body part, in accordance with various embodiments of the present disclosure. Process flow 900 commences at process block 910, where platform 100 accesses a 3D reconstructed model of the user body part. As previously described, the 3D reconstructed model may have been generated based on teachings of the commonly-owned EP applications WO2020240497, entitled "SYSTEM AND METHOD OF GENERATING A 3D REPRESENTATION OF AN OBJECT," filed on May 29, 2020. For example, the 3D point cloud 120 may have been processed by employing numerous filtering, denoising, smoothing, interpolation, and spatial techniques to increase the accuracy of the points/artifacts defining the relevant data for the 3D point cloud reconstruction and/or reduce the number of points which are not relevant to the user body part itself. The 3D point cloud 120 may have been generated based on a series of images captured by the user device 200. A 3D model template of the user body part may have further been morphed onto the 3D point cloud 120, thereby providing a 3D reconstructed model of the user body part. In this embodiment, the 3D reconstructed model may be a 3D point cloud, a 3D meshed surface, a Computer-Aided Design (CAD) file, or any other virtual entity or object suitable for representing the user body part (e.g. comprising information about the user-specific 3D body data parameters) and that may be processed by the platform 100.

In certain embodiments, the available 3D model templates may be associated with body part landmarks, dimensional measurements, spatial, and geometrical attributes, labels, metadata and/or any other relevant information about a corresponding object that they represent. As a result, the 3D reconstructed model may be a landmarked 3D reconstructed model, and/or comprising dimensional measurements, spatial and geometrical attributes, labels, metadata and/or any other information about the user body part after being morphed onto the 3D point cloud 120. As will be described in greater details herein further below, such information may be further used for determining user-item fit characteristics of an item for a user body part.

At a process block 920, platform 100 accesses information about one or more 3D reference models of the item. The accessed information comprises one or more 3D reference models that may be provided by the vendor/merchant. For example, one or more 3D reference models may be provided through the vendor-specific 3D body information/vendor identifier module 108 (as discussed above). As another example, the information comprises lists of body part landmarks indicative of dimensional measurements, spatial and geometrical attributes of items available to the user from the vendor. The list of body part body part landmarks may correspond to a 3D reference model, as the list comprises information that may be used to geometrically describe the 3D reference model.

It will be appreciated that a given 3D reference model may embody a 3D scan, a 3D point cloud, a 3D mesh, a 3D CAD model, voxels, continuous functions (e.g. neural radiance fields), or any other virtual entity or object suitable for representing an item having a known shape and size. Relatedly, each 3D reference model may be associated with labels, semantic labels, one or more object categories, brand information, metadata, identifiers, geometrical attributes (e.g. perimeters of the 3D reference model at different locations). The selection of the one or more 3D reference models is described in greater details herein further below.

Figure 10:
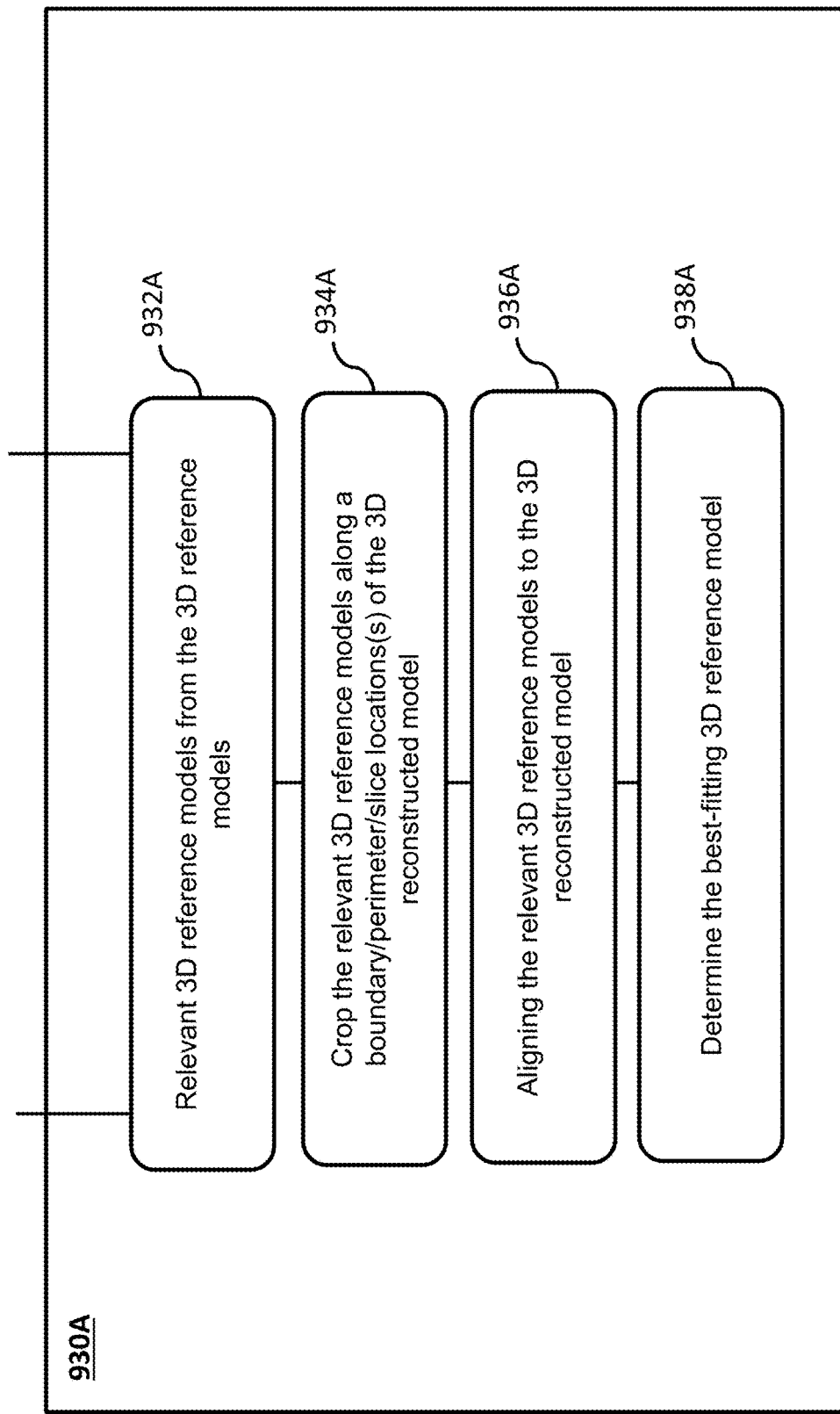
FIG. 10 is representative process flow of the 3D user physical characteristics platform for executing a geometric matching process in accordance with various embodiments of the present disclosure.

At a process block 930, platform 100 executes a 3D matching process between the 3D reconstructed model and the one or more 3D reference models. With reference to FIG. 10, a first embodiment of the 3D matching process is illustrated by process block 930A. At process block 932A, relevant 3D reference models are selected among the 3D reference models provided. For example, the selection may be based on:
- a label of the 3D reconstructed model (e.g. in response to the label of the 3D reconstructed model being "foot", the platform 100 may select 3D reference models labelled "shoe" and/or "sock"), the label may have been generated by the object recognition MLA such that it can be said that selection of the relevant 3D reference models is based on an output of the object recognition MLA;
- an instruction received from the user (e.g. in response to the user indicating, upon scanning the user body part, a desired brand of the item, the platform 100 may select 3D reference models corresponding to the desired brand);
- the user-specific 3D body data parameters previously described;
- and/or any other indication suitable for selecting one or more relevant 3D reference models.

At a process block 934A, platform 100 may determine boundary/perimeter/crop location(s) of a relevant 3D reference model if determination is made that the relevant 3D reference model is a partial representation of the item, crops the 3D reconstructed model along a boundary/perimeter/slice locations(s) of the one or more relevant 3D reference models.

At a process block 936A, platform 100 aligns the one or more relevant 3D reference models with the 3D reconstructed model as it will be described in greater details with reference to FIG. 11. At a process block 938A, platform 100 determines the best-fitting 3D reference model among the one or more relevant 3D reference models. In at least some embodiment, the one or more relevant 3D reference models are ranked in terms of distance to the 3D reconstructed model.

Figure 11:
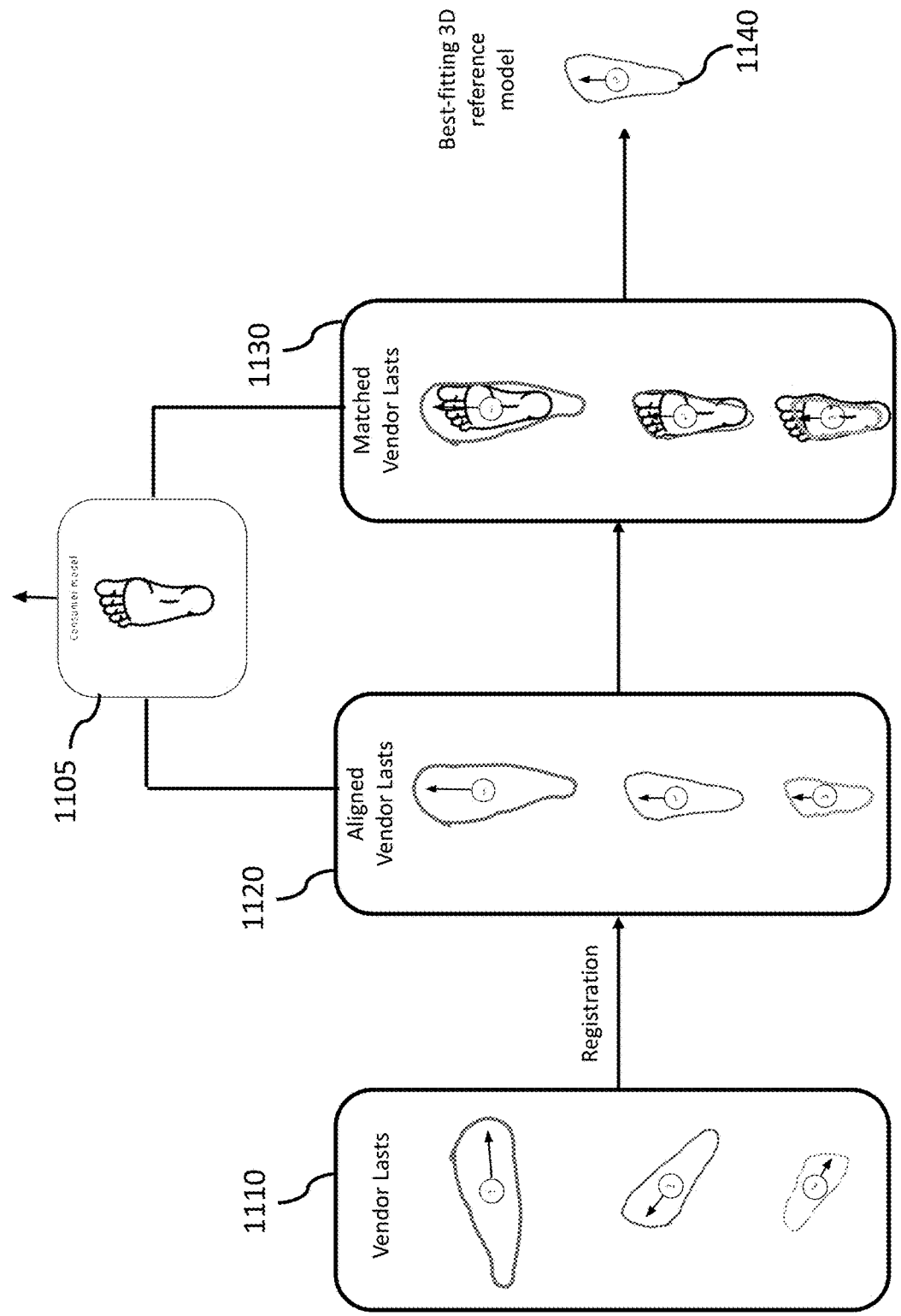
FIG. 11 is an illustrative example of the process flow of FIG. 10.

With reference to FIG. 11, a plurality of relevant 3D reference models 1110 may be provided to the platform 100 by vendors or potential vendors. The relevant 3D reference models 1110 may have been selected based on information about a 3D reconstructed model 1105 received by the platform 100. In this illustrative example, the 3D reconstructed model 1105 represents a foot of a user. That is, the 3D reconstructed model 1105 is a virtual object labelled with information indicating that the user body part being represented by the 3D reconstructed model 1105 is a foot.

In response, the platform 100 may select the relevant 3D reference models 1110, the 3D reference models 1110 being shoe lasts in this illustrative example. In another embodiment, the 3D reference models 1110 may also comprise shoe models. Based on dimensional measurement, and spatial and geometrical attributes, and/or any other suitable information about the relevant 3D reference models 1110 and the 3D reconstructed model 1105, the relevant 3D reference models 1110 are aligned with the relevant 3D reconstructed model 1105. In the illustrative example of FIG. 11, main orientations (depicted as arrows in FIG. 11) of the relevant 3D reference models 1110 and the 3D reconstructed model 1105 are aligned, such that the relevant 3D reference models 1110 may be referred to as "aligned 3D reference models 1120" herein after. It can also be said that the 3D reference models 1120 are registered by the platform 100. Each aligned 3D reference model 1120 is further matched with the 3D reconstructed model 1105 and a distance between the aligned 3D reference model 1120 and the 3D reconstructed model 1105 is determined.

Alignment of and determination of the distance between a given relevant 3D reference model 1110 and the 3D reconstructed object may be performed according to the teachings of operations detailed in the commonly-owned U.S. Patent Publication No. 2021/0158017, entitled "SYSTEMS AND METHODS FOR PERFORMING A 3D MATCH SEARCH IN A 3D DATABASE BASED ON 3D PRIMITIVES AND A CONNECTIVITY GRAPH," filed on Dec. 4, 2020 the contents of which being incorporated by reference in its entirety.

Best-fitting 3D reference model 1140 is further determined based on the matched 3D reconstructed models 1130. In this embodiment, the best-fitting 3D reference model 1140 minimizes a distance between the matched 3D reference models and the 3D reconstructed object 1105, as shown in FIG. 11. In one embodiment, the best-fitting 3D reference model corresponds to the aforementioned matching item determined at process task 608. As an example, the best-fitting 3D reference model 1140 may be a shoe model corresponding to the matching item determined at process task 608, the shoe model corresponding to a shoe having a size that fits a 3D reconstructed model of a foot of a user. As another example, the best-fitting 3D reference model 1140 may be a shoe last, as depicted in FIG. 11, the shoe last being associated with one or more shoe models in the vendor database. In this example, one shoe model may be further selected by the user among the one or more shoe models identified based on the best-fitting 3D reference model 1140.

Figure 12:
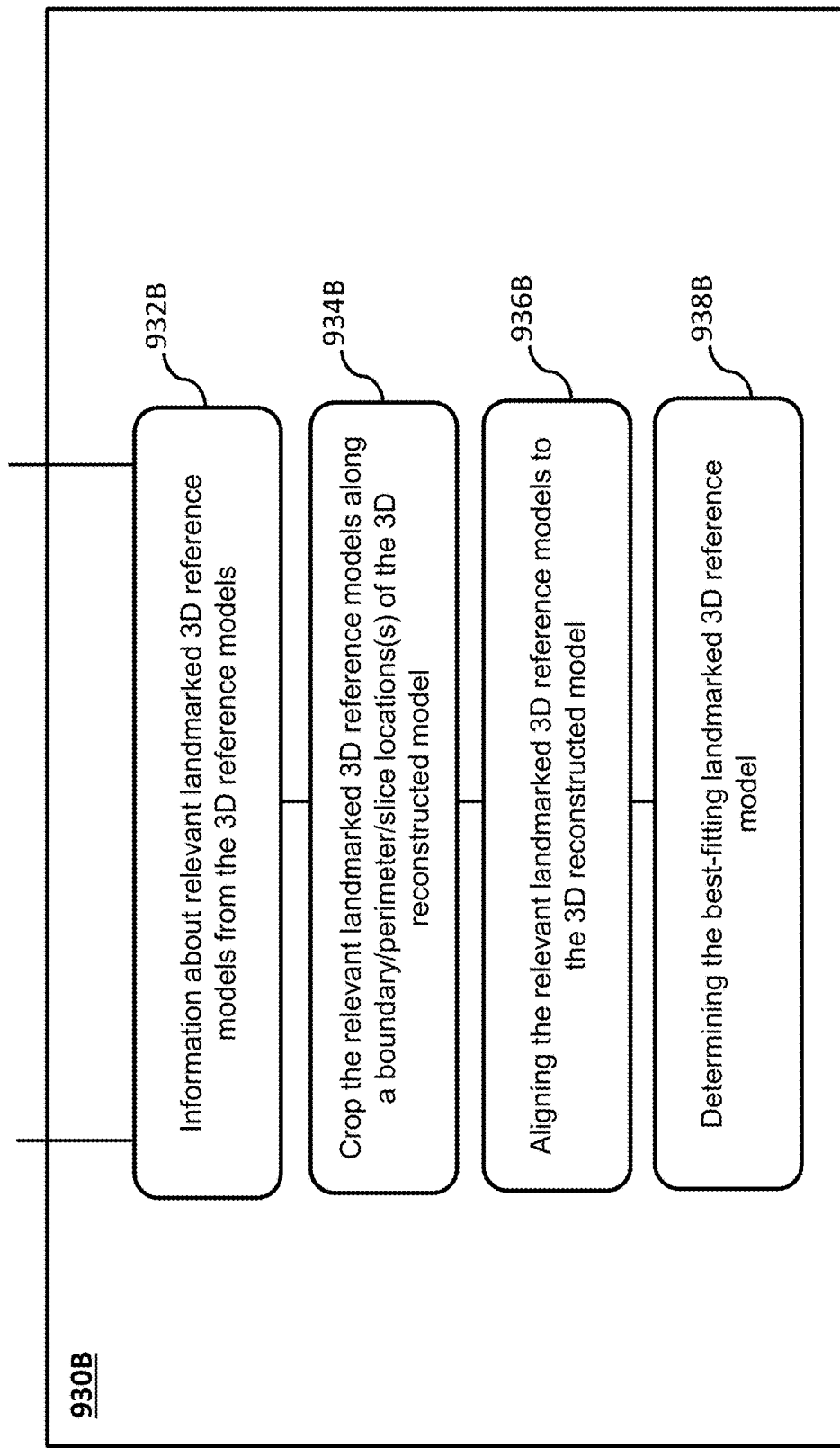
FIG. 12 is representative process flow of the 3D user physical characteristics platform for executing a landmark matching process in accordance with various embodiments of the present disclosure.

In the context of the present disclosure, it can be said that operations described at the process block 930A are a geometrical matching process. Indeed, geometric comparison is made between the 3D reference models and the 3D reconstructed model to determine the best-fitting 3D reference model. Alternatively or optionally, a landmark matching process may be executed to determine the best-fitting 3D reference model or refine the selection thereof. With reference to FIG. 12, a second embodiment of the 3D matching process of process block 930 in FIG. 9 is illustrated by process block 930B.

At process block 932B, relevant information accessed in the vendor database 3D reference models may be landmarked 3D reference models, namely 3D reference models comprising body part landmarks about predetermined geometrical features of the 3D reference models, or lists of landmark indications that may be used to describe 3D reference models. Relevant 3D reference models or lists of body part landmarks are respectively selected among the 3D reference models or lists of landmarks provided by the vendor. For example, the selection may be based on:

- a label of the 3D reconstructed model (e.g. in response to the label of the 3D reconstructed model being "foot", the platform 100 may select 3D reference models labelled "shoe" and/or "sock");
- an instruction received from the user (e.g. in response to the user indicating, upon scanning the user body part, a desired brand of the item, the platform 100 may select 3D reference models corresponding to the desired brand);
- the user-specific 3D body data parameters previously described;
- and/or any other indication suitable for selecting one or more relevant 3D reference models.

Figure 13:
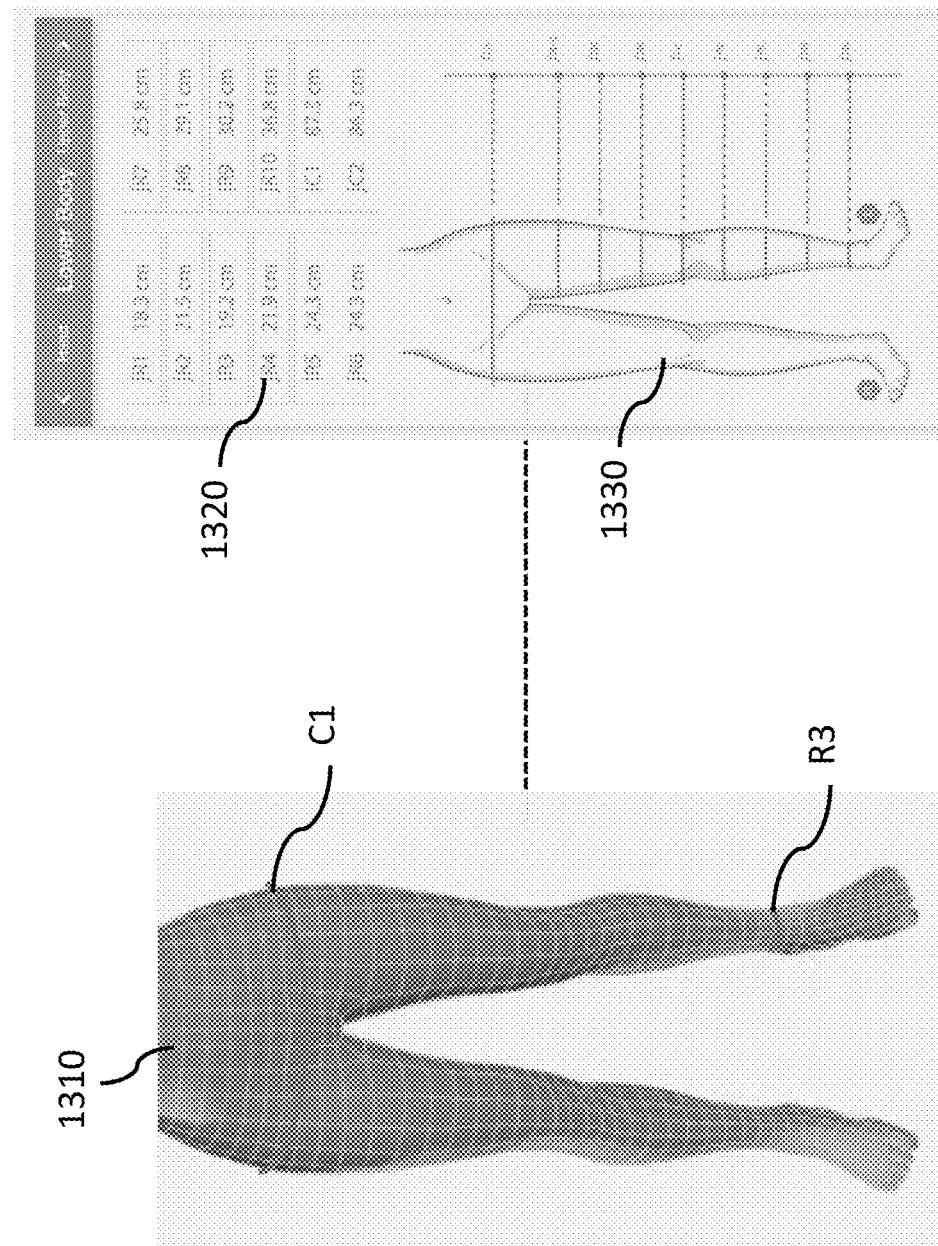
FIG. 13 depicts an illustrative list of body part landmarks and a 3D reference model generated therefrom.

With reference to FIG. 13, there is depicted a list of body part landmarks 1320 that may be accessed in the vendor database. The list of body part landmarks 1320 described geometrical features of a 3D reference model that may be reconstructed or generated based on the list. For example, the body part landmarks 1320 may be circumference values of a leg at different positions along the leg. The positions may be predetermined based on norms and/or standard in the textile and apparel sector. It should be appreciated that each landmark is associated with a respective position of the corresponding 3D reference model based on, for example, norms and standard in the field of a current application of the platform 100. By way of clarification regarding body part landmarks 1320, a body part 1330 is illustrated by FIG. 13, in which each landmark corresponds to a geometrical feature of a lower body part. For example, the landmark noted C1 is indicative of a hip circumference and the landmark noted R3 is indicative of an ankle circumference on the left leg.

Also, at process block 932B, a corresponding relevant landmarked 3D reference model 1310 may be generated by the platform 100 upon accessing the list of body part landmarks 1320, the body part landmarks and their associated positions enabling the platform 100 to generate the landmarked 3D reference model 1310.

At a process block 934B, platform 100 may determine boundary/perimeter/crop location(s) of a relevant landmarked 3D reference models if determination is made that the relevant landmarked 3D reference models is a partial representation of the item, and crops the 3D reconstructed model along a boundary/perimeter/slice locations(s) of the one or more relevant landmarked 3D reference models.

At a process block 936B, platform 100 aligns the one or more relevant landmarked 3D reference models with the 3D reconstructed model. Such an alignment may comprise identifying geometrical features of the 3D reconstructed model to determine positions where the body part landmarks of the relevant landmarked 3D reference models are to be aligned with. For example, the platform 100 may determine location of an ankle of a left leg of lower body part in a 3D reconstructed model, such that the landmark R3 may be aligned therewith.

Figure 14:
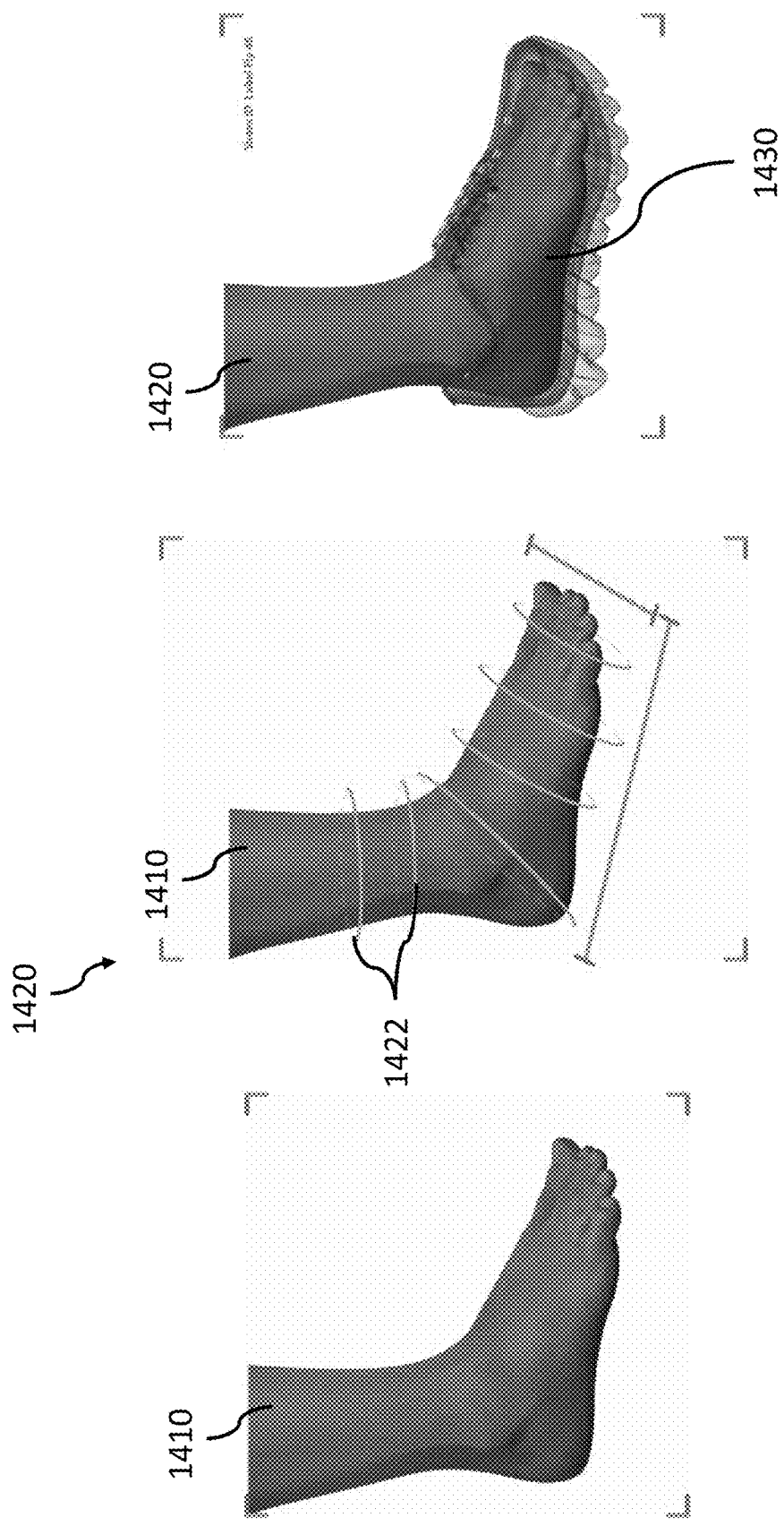
FIG. 14 is an illustrative example of parts of the process flow of FIG. 12.

More specifically and with reference to FIG. 14, there is shown a 3D reconstructed model 1410 of a foot of a user. An object recognition MLA may be used to determine specific body part landmarks 1422, thereby generating a landmarked 3D reconstructed model 1420. In other words, the landmarked 3D reconstructed model 1420 is the 3D reconstructed model 1410 augmented with body part landmarks 1422. The body part landmarks 1422 may be indicative of areas of interest of the 3D reconstructed model 1410, dimensional measurement, spatial and geometrical characteristics of the 3D reconstructed model 1410, or any other information that may be determined by the object recognition MLA. A landmarked 3D reference model 1430 may be further aligned with the landmarked 3D reconstructed model 1420 based on the alignment of the body part landmarks of both the landmarked 3D reconstructed model 1420 and landmarked 3D reconstructed model 1420. Alternatively, the alignment is made based on the aforementioned process described in FIG. 11.

Figure 15:
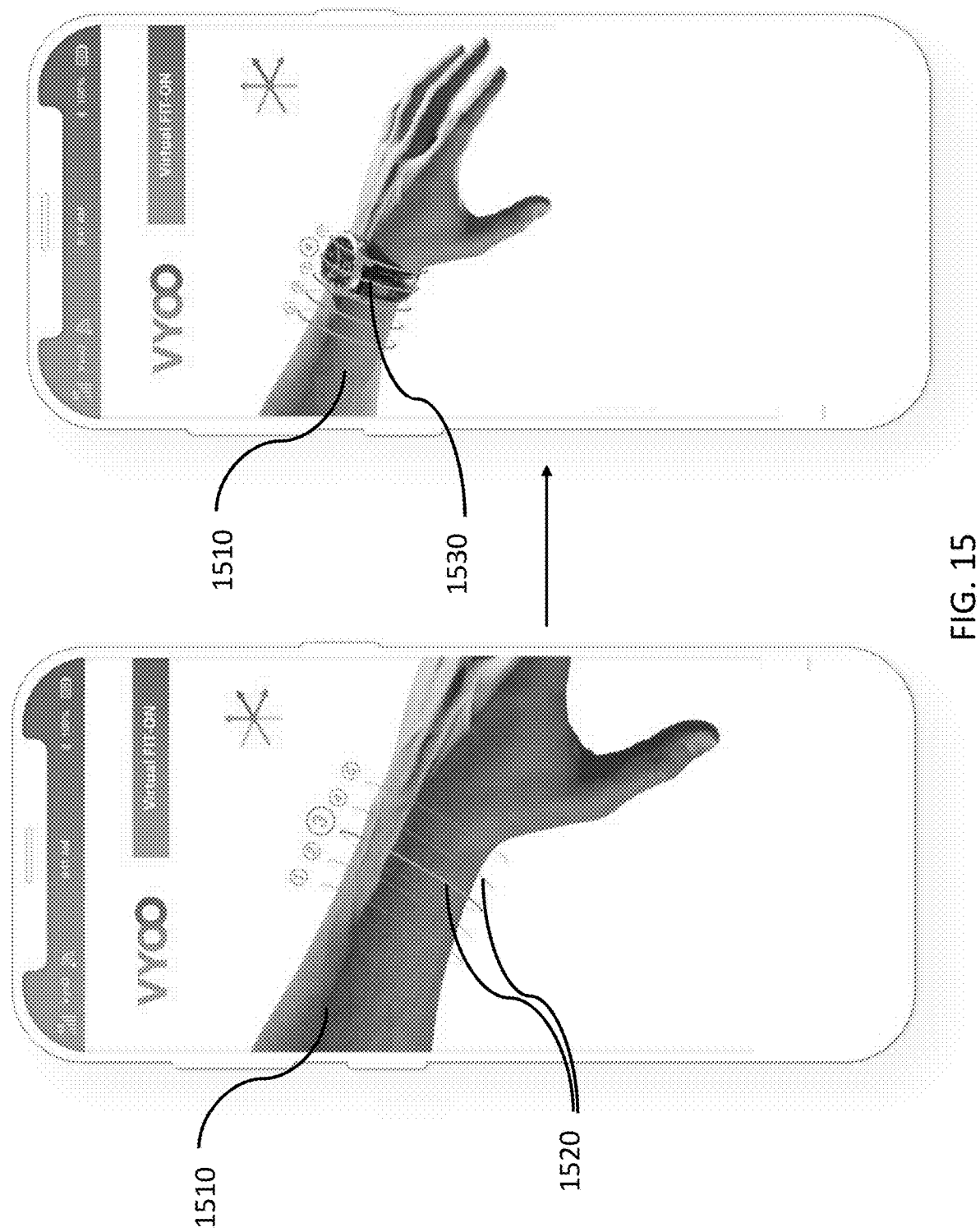
FIG. 15 is visuals of a 3D reconstructed model augmented with body part landmarks for position selection and a 3D reference model integrated thereon to be displayed to a user.

As another example and with reference to FIG. 15, there is illustrated a 3D reconstructed model 1510 augmented with body part landmarks 1520. The body part landmarks 1520 generated by the object recognition MLA are used to align a landmarked 3D reference model 1530 on the 3D reconstructed model 1510. In this embodiment, the body part landmarks 1520 are thus displayed to the user so the user may select characteristics of an alignment of the landmarked 3D reference model with the 3D reconstructed model. As a result, the user may adjust a position of the landmarked 3D reference model relatively to the 3D reconstructed model. It can thus be said that the platform 100 adjusts, based on instructions received from the user, a position of the best-fitting 3D reference model relative to the 3D reconstructed model.

Referring back to FIG. 12, at a process block 938B, platform 100 determines the best-fitting landmarked 3D reference model among the one or more relevant 3D reference models. In at least some embodiment, the one or more relevant 3D reference models are ranked in terms of distance to the 3D reconstructed model. For example, for q given relevant landmarked 3D reference model, distances may be measured between the given relevant landmarked 3D reference model and the 3D reconstructed model at the positions of the body part landmarks of the relevant landmarked 3D reference model. An average distance of the distances between the given relevant landmarked 3D reference model and the 3D reconstructed model at the positions of the body part landmarks may be determined and further used as a ranking-feature to rank the relevant landmarked 3D reference models. The best-fitting landmarked 3D reference model minimizes the average distance. Alternatively or additionally, determination of the distance between a given relevant landmarked 3D reference model and the 3D reconstructed object may be performed according to the teachings of operations detailed in the commonly-owned U.S. Patent Publication No. 2021/0158017, entitled "SYSTEMS AND METHODS FOR PERFORMING A 3D MATCH SEARCH IN A 3D DATABASE BASED ON 3D PRIMITIVES AND A CONNECTIVITY GRAPH". In one embodiment, the best-fitting 3D reference model minimizes a distance between the matched 3D reference models and the 3D reconstructed object.

In the context of the present disclosure, it can be said that operations described at the process block 930B are a landmark matching process. Indeed, body part landmarks associated with the landmarked 3D reference models are used to compare the landmarked 3D reference models to the 3D reconstructed model to further determine the best-fitting 3D reference model.

In one aspect, the present technology provides a method for generating visual indications of "comfortability" of an item to a user, the comfortability being determined for that specific user and for the specific item. Referring back to FIG. 9, the process flow 900 of platform 100 continues with integrating, at process block 940 the best-fitting 3D reference model onto the 3D reconstructed model. The integration may be performed by combining, by the platform 100, the best-fitting 3D reference model and the 3D reconstructed model to generate a new virtual object representation representative of the item place on the user body part, the item being represented by the best-fitting 3D reference model and the user body part being represented by the 3D reconstructed model.

Upon the integration being executed, the platform 100 is configured to determine user-item fit characteristics based on the generated new virtual object representation representative of the item place on the user body part. In this embodiment, user-time fit characteristics are representative of potential comfortability that the user would feel upon wearing the item. More specifically, the user-time fit characteristics are determined by locating local voids and local collisions between the best-fitting 3D reference model and the 3D reconstructed object, the void being representative of potential gaps between the user body part and the item, and collisions being representative of potential frictions between the user body part and the item that the user would feel upon wearing the item.

Figure 16:
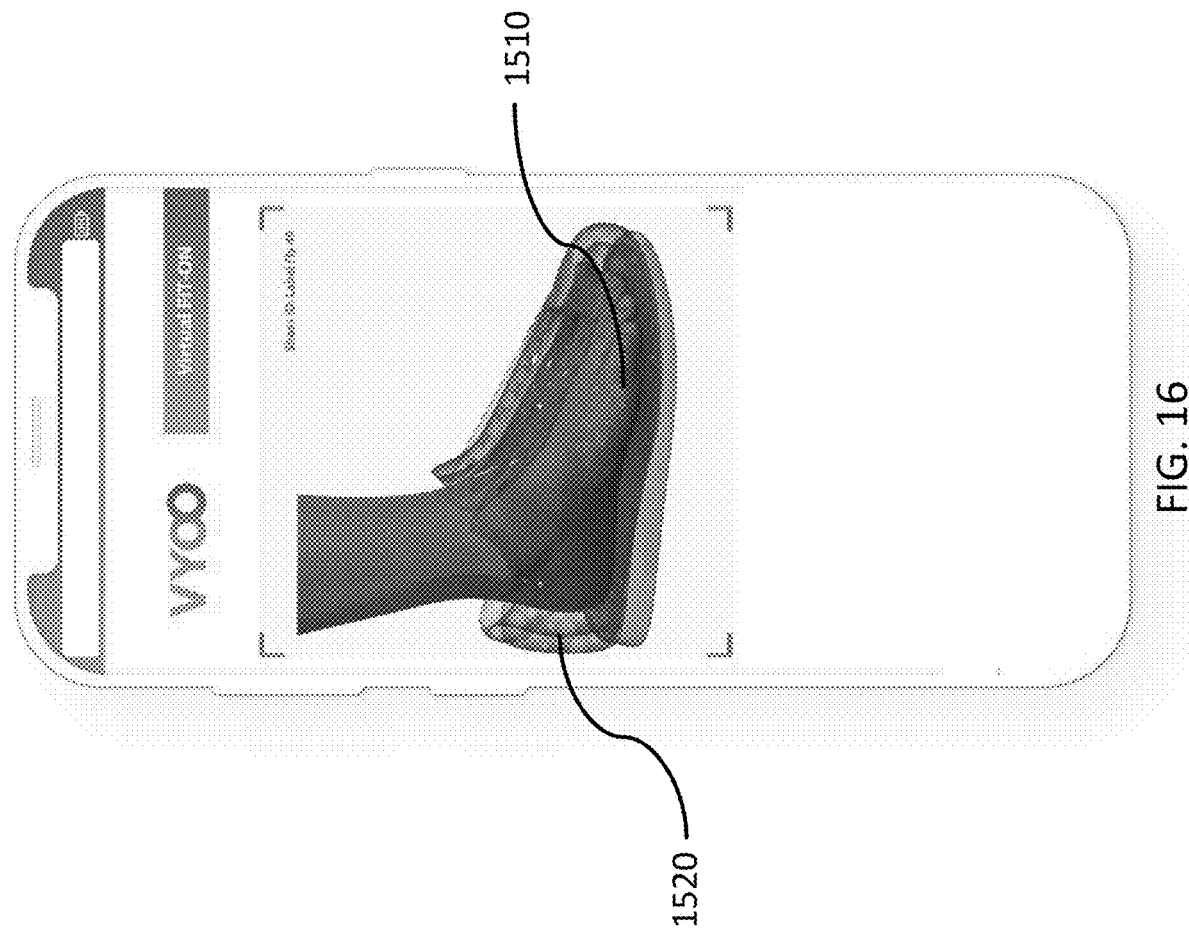
FIG. 16 is a visual of a best-fitting 3D reference model integrated on a 3D reconstructed model along with visual indication of user-item fit characteristics.

With reference to FIG. 16, for each local collision, a volume of the overlap is determined by the platform 100. For example, a volume of a sphere maximizing volume occupancy in a 3D volume of the overlap may be determined to account for the volume of the overlap. If the volume is above a first threshold, the platform 100 generates a visual indication such as visual indication 1510 on FIG. 16. In this embodiment, the first threshold may depend on a location of the local collision on the 3D reconstructed model and/or on the 3D reference model. In other words, the first threshold for local collision may vary along the 3D reconstructed model and/or along the 3D reference model. For example, variation of the first threshold as a function of a position on the 3D reference model may be stored in a memory that may be accessed by the platform 100.

Similarly, for each local void, a volume of the gap between the best-fitting 3D reference model and the 3D reconstructed object is determined by the platform 100. For example, a volume of a sphere maximizing volume occupancy in a 3D volume of the gap may be determined to account for the volume of the gap. If the volume is above a second threshold, the platform 100 generates a visual indication such as visual indication 1520 on FIG. 16 indicative of a local gap. In this embodiment, the second threshold may also depend on a location of the local void on the 3D reconstructed model and/or on the 3D reference model. In other words, the second threshold for local collision may also vary along the 3D reconstructed model and/or along the 3D reference model. For example, variation of the second threshold as a function of a position on the 3D reference model may be stored in a memory that may be accessed by the platform 100.

The local gaps and local voids may be determined in pre-defined target areas of the new virtual object representation representative of the item place on the user body part. More specifically, the 3D reference models of the 3D reconstructed model may comprise information of pre-defined discomfort-prone areas where the local gaps and local voids are to be determined upon integration on the 3D reconstructed model, the pre-defined discomfort-prone areas being further identified as the pre-defined target areas to determine existence of local voids and/or local gaps.

As such, it can be said that visual indications such as visual indications 1510, 1520 gives information about local comfortability of the user. To summarize, visual indications of user-time fit characteristics are determined, rendered and display to the user, such that the user is provided with a visual indication of a comfortability that the user would feel upon wearing the item.

In one aspect, the present technology enables the user to adjust a representation of the best-fitting 3D reference model integrated on the 3D reconstructed object. Upon displaying the new virtual object representation representative of the item place on the user body part to the user, the platform 100 may enable the user to choose another 3D reference model to be integrated on the 3D reconstructed object and displayed to the user. With reference to FIG. 16, the platform 100 provides the user with a selection choice of size of the item, depicted as a carousel 1710 in this illustrative embodiment, each size corresponding to a 3D reference model as described herein above. In response to the user selecting a new size for the item, the platform 100 may identify the corresponding 3D reference model as a new best-fitting 3D reference model, a "current best-fitting 3D reference model, or a "user-selected 3D reference model".

Figure 17:
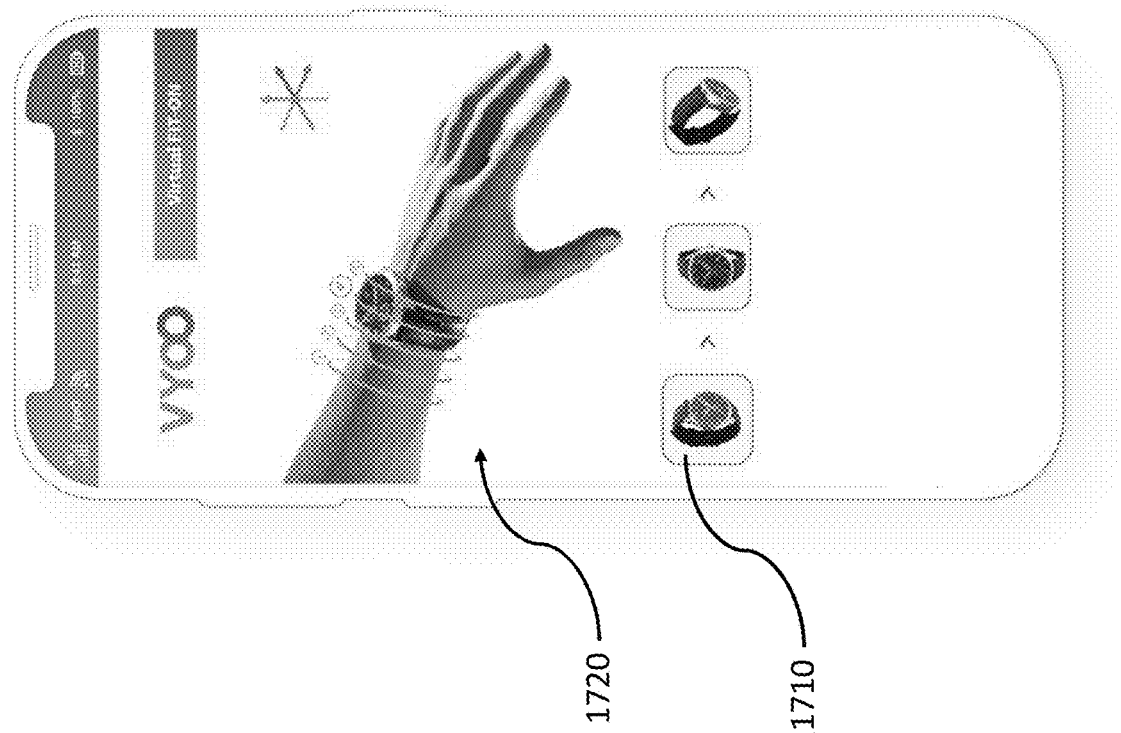
FIG. 17 is a visual of a best-fitting 3D reference model integrated on a 3D reconstructed model along with a carousel for selection of a size of the item represented by the best-fitting 3D reference model.

In this embodiment, the sizes proposed to the user and displayed thereto correspond to 3D reference models that are close or adjacent to the best-fitting 3D reference model in the ranking established at process blocks 938A and/or 938B. For example, the sizes proposed to the user may be the size directly above and the size directly below the size of the best-fitting 3D reference model. In response to the user selecting a size different than the size of the displayed best-fitting 3D reference model, the size corresponding to a user-selected 3D reference model, the platform integrates the user-selected 3D reference model onto the 3D reconstructed model as described in FIGS. 14 and 15. The integration is then rendered and displayed as a 3D user-selected representation 1720 on FIG. 17.

VI. 3D User Platform Transaction Applications

As described above, the 3D user physical characteristics-based services transaction platform 100 provides an infrastructure that expedites user electronic/online transactions by minimizing user interactions in searching and procuring items/services personalized or customized to user needs based on user physical attributes and preferences.

It should be understood that platform 100 is designed to span across numerous service entities and applications to expedite, improve, and minimize user electronic/online interactions in searching and procuring personalized/customized products and services. As is clear, based on the platform's captured and stored user detailed physical data, the platform is suitable for purchasing products customized to user's physical attributes.

Additionally, based on the platform's captured and stored user detailed physical data, the platform is suitable for medical, health, and health insurance applications to expedite various diagnoses, treatment, and coverage determination regarding, for example, musculoskeletal parameters, bone density/mass estimates, posture analysis, ailments contributing to body changes, orthotics, prosthetics, optometric products etc. The platform's captured and stored user detailed physical data is also suitable for fitness applications in tracking, for example, body shape, weight loss, body morphology, user progress in attainment of fitness goals. Furthermore, the platform's captured and stored user detailed physical data to provide a unique user physical identifier that is based on user biometric data to expedite authentication and identification processes.

As such, the foregoing description of the specific embodiments fully reveals the general nature of the disclosure and inventive concepts that others can, by applying knowledge within the skill of the relevant art(s) (including the contents of the documents cited and incorporated by reference herein), readily modify and/or adapt for various applications such specific embodiments, without undue experimentation and without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While the above-described implementations have been described and shown with reference to particular steps performed in a particular order, it will be understood that these steps may be combined, sub-divided, or re-ordered without departing from the teachings of the present technology. The steps may be executed in parallel or in series. Accordingly, the order and grouping of the steps is not a limitation of the present technology.

While various embodiments of the present disclosure have been described above, it should be understood that they have been presented by way of example, and not limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A method for executing an electronic purchasing transaction between a user and a vendor for an item relating to the user's physical characteristics, the method comprising:
    storing, in a user body database, three dimensional (3D) user body information containing user-specific 3D representations, measurements, and characteristics of the user's body or body parts;
    storing, in a vendor database, vendor-specific information identifying potential vendors containing items relevant to the stored 3D user body information;
    in response to a user request for the item, executing a search in the vendor database for the requested item conforming to the stored 3D user body information; and
    forwarding search results to the user.

2. The method of claim 1, wherein, when a match to the requested item is not identified, the search results comprise alternatives to the item.

3. The method of claim 1, wherein, when a match to the requested item is identified, the search results comprise a request for acceptance of the matched item and upon acceptance, the purchasing transaction with the vendor is executed.

4. The method of claim 1, further comprising storing one or more databases comprising biometric identification information, user body topology information, and body morphological tracking information.

5. The method of claim 1, further comprising filtering and aggregating item data provided by the vendor in accordance with user-specific 3D representations, measurements, and the characteristics of the user's body or body parts.

6. The method of claim 1, wherein the 3D user body information is stored in a secure application.

7. The method of claim 1, wherein the vendor-specific information identifying potential vendors includes information collected from previous interactions and/or inquiries with vendors.

8. The method of claim 1, wherein the search results comprise a visual display and corresponding information of a matching item or alternatives to the item.

9. The method of claim 1, further comprising:
    assigning portions of the stored user-specific 3D representations, measurements, and characteristics of the user's or body parts hash key values; and
    processing the hash key values with a hash function to generate a hash code representing a unique user physical identifier.

10. The method of claim 9, further comprising correlating the generated hash code with a user device identifier or user device password credential.

11. A system for executing an electronic purchasing transaction between a user and a vendor, on a mobile communication device, for an item relating to the user's physical characteristics, the system comprising:
    at least one processor for executing instructions initiated by user requests;
    a user body database configured to store three dimensional (3D) user body information containing user-specific 3D representations, measurements, and characteristics of the user's body or body parts;
    a vendor database configured to store vendor-specific information identifying potential vendors containing items relevant to the stored 3D user body information; and
    a communication interface for establishing wireless communications with a potential vendor and external entities,
    wherein, in response to a user request for the item, the at least one processor executes a search in the vendor database and external entities for the item conforming to the stored 3D user body information and forwards search results to the user.

12. The system of claim 11, wherein, when the search does not identify a match to the item by a vendor, the at least one processor forwards alternatives to the user for consideration based on information from the search results.

13. The system of claim 11, wherein, when the search identifies a match to the requested item by a vendor, the at least one processor forwards a request for acceptance of the matched item to the user and upon acceptance, the at least one processor executes the purchasing transaction with the vendor.

14. The system of claim 11, further comprising one or more databases storing biometric identification information, user body topology information, and body morphological tracking information.

15. The system of claim 11, further comprising a universal size guide module configured to communicate with the at least one processor and execute instructions to filter and aggregate item data provided by the vendor in accordance with user-specific 3D representations, measurements, and characteristics of the user's body or body parts.

16. The system of claim 11, wherein the 3D user body information is stored in a secure application provided by a manufacturer of the mobile communication device.

17. The system of claim 11, wherein the forwarded search results to the user include a visual display and corresponding information of a matching item or alternative items.

18. The system of claim 11, wherein portions of the stored user-specific 3D representations, measurements, and characteristics of the user's body or body parts are assigned hash key values and the hash key values are processed by a hash function to generate a hash code representing a unique user physical identifier.

19. The system of claim 11, wherein the user-specific 3D representations, measurements, and characteristics of the user's body or body parts were determined based on a 3D body scan of the user.

20. A non-transitory computer-readable medium comprising-executable instructions for executing an electronic purchasing transaction between a user and a vendor for an item relating to the user's physical characteristics, wherein the instructions, upon being executed by a system, cause the system to:

store, in a user body database, three dimensional (3D) user body information containing user-specific 3D representations, measurements, and characteristics of the user's body or body parts;

store, in a vendor database, vendor-specific information identifying potential vendors containing items relevant to the stored 3D user body information;

in response to a user request for the item, execute a search in the vendor database for the requested item conforming to the stored 3D user body information; and forward search results to the user.

\* \* \* \* \*